US010088558B2

(12) United States Patent
Dussan

(10) Patent No.: US 10,088,558 B2
(45) Date of Patent: *Oct. 2, 2018

(54) METHOD AND SYSTEM FOR LADAR TRANSMISSION WITH SPIRAL DYNAMIC SCAN PATTERNS

(71) Applicant: AEYE, Inc., Fairview Heights, IL (US)

(72) Inventor: Luis Carlos Dussan, Dublin, CA (US)

(73) Assignee: AEYE, INC., Fairview Heights, IL (US)

( * ) Notice: Subject to any disclaimer, the term of this patent is extended or adjusted under 35 U.S.C. 154(b) by 539 days.

This patent is subject to a terminal disclaimer.

(21) Appl. No.: 14/827,189

(22) Filed: Aug. 14, 2015

(65) Prior Publication Data

US 2016/0047898 A1 Feb. 18, 2016

Related U.S. Application Data

(60) Provisional application No. 62/038,065, filed on Aug. 15, 2014.

(51) Int. Cl.
| | |
|---|---|
| G01C 3/08 | (2006.01) |
| G01S 7/484 | (2006.01) |
| G01S 17/89 | (2006.01) |
| G01S 17/10 | (2006.01) |
| G01S 7/481 | (2006.01) |
| G01S 7/486 | (2006.01) |
| G01S 17/87 | (2006.01) |
| G01S 17/42 | (2006.01) |
| G01S 17/93 | (2006.01) |

(Continued)

(52) U.S. Cl.
CPC .......... *G01S 7/484* (2013.01); *G01S 7/4814* (2013.01); *G01S 7/4817* (2013.01); *G01S 7/4861* (2013.01); *G01S 17/10* (2013.01); *G01S 17/42* (2013.01); *G01S 17/87* (2013.01); *G01S 17/89* (2013.01); *G01S 17/936* (2013.01); *G01S 7/499* (2013.01); *G01S 17/023* (2013.01)

(58) Field of Classification Search
CPC ...... G01S 7/484; G01S 7/4814; G01S 7/4817; G01S 7/4861; G01S 17/10; G01S 17/42; G01S 17/87; G01S 17/89; G01S 7/499; G01S 17/023
See application file for complete search history.

(56) References Cited

U.S. PATENT DOCUMENTS

| | | |
|---|---|---|
| 4,579,430 A | 4/1986 | Bille |
| 5,552,893 A | 9/1996 | Akasu |
| 5,638,164 A | 6/1997 | Landau |

(Continued)

FOREIGN PATENT DOCUMENTS

| | | |
|---|---|---|
| CN | 103885065 A | 6/2014 |
| WO | 2004034084 A1 | 4/2004 |

(Continued)

OTHER PUBLICATIONS

International Search Report and Written Opinion for PCT/US15/45399 dated Feb. 2, 2016.

(Continued)

*Primary Examiner* — Samantha K Abraham
(74) *Attorney, Agent, or Firm* — Thompson Coburn LLP

(57) ABSTRACT

Various embodiments are disclosed for improved scanning ladar transmission, including but not limited to an example embodiment where a scanning ladar transmission system employs a spiral dynamic scan pattern.

36 Claims, 31 Drawing Sheets

(51) Int. Cl.
*G01S 7/499* (2006.01)
*G01S 17/02* (2006.01)

(56) References Cited

U.S. PATENT DOCUMENTS

| | | | |
|---|---|---|---|
| 5,808,775 | A | 9/1998 | Inagaki et al. |
| 5,831,719 | A | 11/1998 | Berg et al. |
| 6,245,590 | B1 | 6/2001 | Wine et al. |
| 6,288,816 | B1 | 9/2001 | Melville et al. |
| 6,847,462 | B1 | 1/2005 | Kacyra et al. |
| 7,206,063 | B2 | 4/2007 | Anderson et al. |
| 7,236,235 | B2 | 6/2007 | Dimsdale |
| 7,701,558 | B2 | 4/2010 | Walsh et al. |
| 7,800,736 | B2 | 9/2010 | Pack et al. |
| 7,894,044 | B1 | 2/2011 | Sullivan |
| 7,944,548 | B2 | 5/2011 | Eaton |
| 8,072,663 | B2 | 12/2011 | O'Neill et al. |
| 8,081,301 | B2 | 12/2011 | Stann et al. |
| 8,120,754 | B2 | 2/2012 | Kaehler |
| 8,228,579 | B2 | 7/2012 | Sourani |
| 8,427,657 | B2 | 4/2013 | Milanovi |
| 8,681,319 | B2 | 3/2014 | Tanaka et al. |
| 8,896,818 | B2 | 11/2014 | Walsh et al. |
| 9,069,061 | B1 | 6/2015 | Harwit |
| 9,085,354 | B1 | 7/2015 | Peeters et al. |
| 9,128,190 | B1 | 9/2015 | Ulrich et al. |
| 9,261,881 | B1 | 2/2016 | Ferguson et al. |
| 9,278,689 | B1 | 3/2016 | Delp |
| 9,285,477 | B1 | 3/2016 | Smith et al. |
| 9,305,219 | B2 | 4/2016 | Ramalingam et al. |
| 9,315,178 | B1 | 4/2016 | Ferguson et al. |
| 9,360,554 | B2 | 6/2016 | Retterath et al. |
| 9,437,053 | B2 | 9/2016 | Jenkins et al. |
| 9,575,184 | B2 | 2/2017 | Gilliland et al. |
| 9,885,778 | B2 | 2/2018 | Dussan |
| 9,897,689 | B2 | 2/2018 | Dussan |
| 2005/0057654 | A1 | 3/2005 | Byren |
| 2006/0176468 | A1 | 8/2006 | Anderson et al. |
| 2009/0128864 | A1 | 5/2009 | Inage |
| 2010/0027602 | A1 | 2/2010 | Abshire et al. |
| 2010/0053715 | A1 | 3/2010 | O'Neill et al. |
| 2011/0149268 | A1 | 6/2011 | Marchant et al. |
| 2011/0260036 | A1 | 10/2011 | Baraniuk et al. |
| 2012/0044093 | A1 | 2/2012 | Pala |
| 2012/0044476 | A1 | 2/2012 | Earhart et al. |
| 2012/0236379 | A1 | 9/2012 | da Silva et al. |
| 2012/0249996 | A1 | 10/2012 | Tanaka et al. |
| 2012/0257186 | A1 | 10/2012 | Rieger et al. |
| 2014/0211194 | A1 | 7/2014 | Pacala et al. |
| 2014/0291491 | A1 | 10/2014 | Shpunt et al. |
| 2015/0081211 | A1 | 3/2015 | Zeng et al. |
| 2015/0331113 | A1 | 11/2015 | Stettner et al. |
| 2015/0369920 | A1 | 12/2015 | Setono et al. |
| 2015/0378187 | A1 | 12/2015 | Heck et al. |
| 2016/0047895 | A1 | 2/2016 | Dussan |
| 2016/0047896 | A1 | 2/2016 | Dussan |
| 2016/0047897 | A1 | 2/2016 | Dussan |
| 2016/0047899 | A1 | 2/2016 | Dussan |
| 2016/0047900 | A1 | 2/2016 | Dussan |
| 2016/0047903 | A1 | 2/2016 | Dussan |
| 2016/0274589 | A1 | 9/2016 | Templeton et al. |
| 2016/0293647 | A1 | 10/2016 | Lin et al. |
| 2017/0158239 | A1 | 6/2017 | Dhome et al. |
| 2017/0205873 | A1 | 7/2017 | Shpunt et al. |
| 2017/0234973 | A1 | 8/2017 | Axelsson |
| 2017/0242102 | A1 | 8/2017 | Dussan et al. |
| 2017/0242103 | A1 | 8/2017 | Dussan |
| 2017/0242104 | A1 | 8/2017 | Dussan |
| 2017/0242105 | A1 | 8/2017 | Dussan et al. |
| 2017/0242106 | A1 | 8/2017 | Dussan et al. |
| 2017/0242107 | A1 | 8/2017 | Dussan et al. |
| 2017/0242109 | A1 | 8/2017 | Dussan et al. |

FOREIGN PATENT DOCUMENTS

| | | |
|---|---|---|
| WO | 2006076474 A1 | 7/2006 |
| WO | 2008008970 A2 | 1/2008 |
| WO | 2016025908 A2 | 2/2016 |

OTHER PUBLICATIONS

Howland et al., "Compressive Sensing LIDAR for 3D Imaging", Optical Society of America, May 1-6, 2011, 2 pages.

Moss et al., "Low-cost compact MEMS scanning LADAR system for robotic applications", Proc. of SPIE, 2012, vol. 8379, 837903-1 to 837903-9.

Analog Devices, "Data Sheet AD9680", 98 pages, 2014-2015.

Kessler, "An afocal beam relay for laser XY scanning systems", Proc. of SPIE vol. 8215, 9 pages, 2012.

Maxim Integrated Products, Inc., Tutorial 800, "Design a Low-Jitter Clock for High Speed Data Converters", 8 pages, Jul. 17, 2002.

Redmayne et al., "Understanding the Effect of Clock Jitter on High Speed ADCs", Design Note 1013, Linear Technology, 4 pages, 2006.

Rehn, "Optical properties of elliptical reflectors", Opt. Eng. 43(7), pp. 1480-1488, Jul. 2004.

Sharafutdinova et al., "Improved field scanner incorporating parabolic optics. Part 1: Simulation", Applied Optics, vol. 18, No. 22, p. 4389-4396, Aug. 2009.

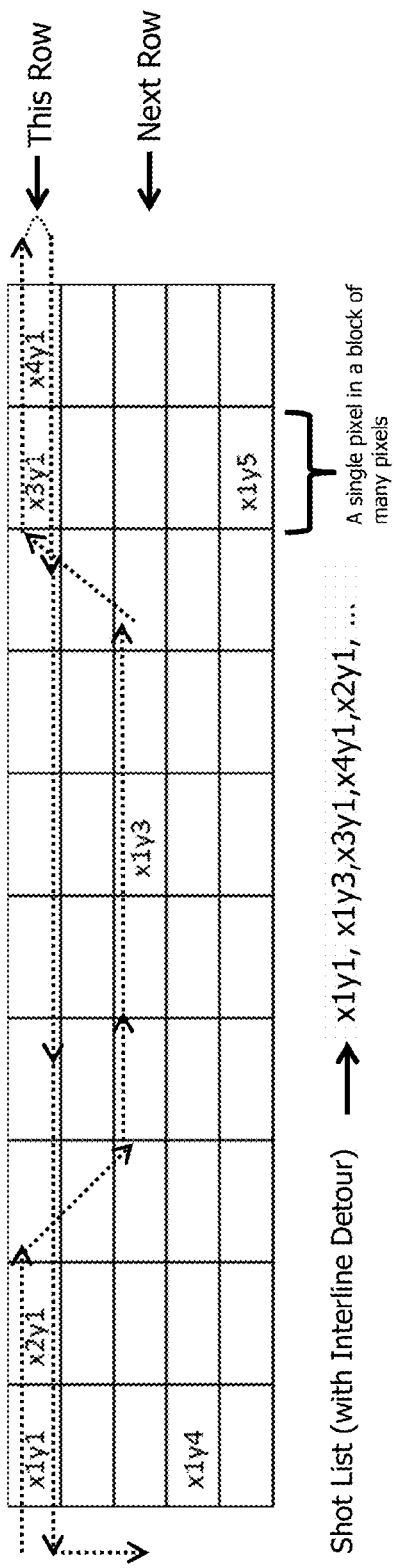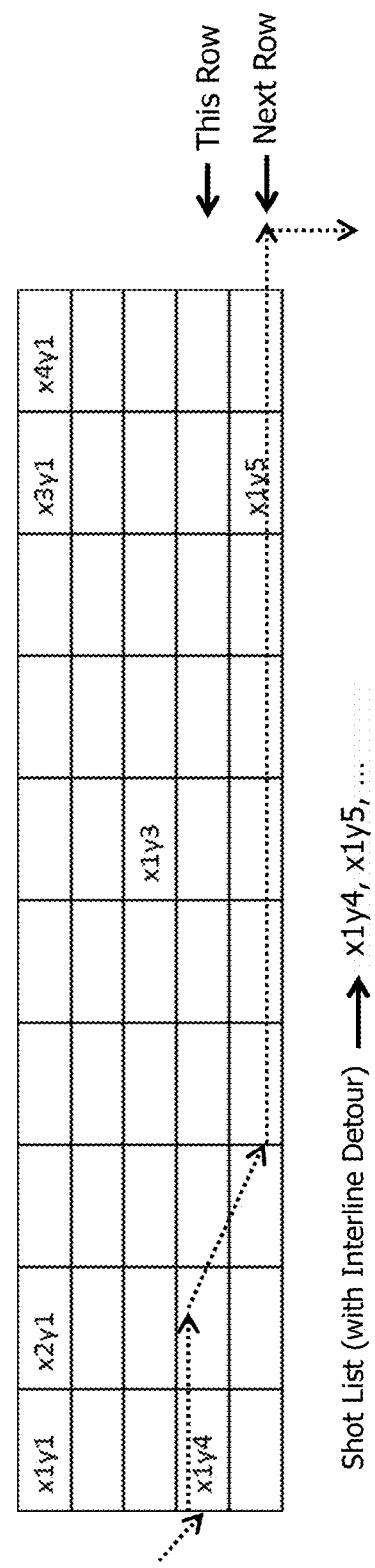

| Rangepoint List 240 | | Shot List 950 | | 952 Left to right or right to left | 954 Is it a live waypoint or a real fire command | 956 One of several intensity modulated codes | 958 Alerts the system that an interline skip occurs right after |
|---|---|---|---|---|---|---|---|
| row | column | 10 bits Srow | 10 bits SCol | L2R | Fire | Pulse Pattern | InterSkip |
| 104 | 19 | 104 | 19 | 1 | 1 | 1 | 0 |
| 104 | 26 | 104 | 26 | 0 | 1 | 1 | 0 |
| 105 | 4 | 105 | 4 | 1 | 1 | 1 | 0 |
| 105 | 13 | 105 | 13 | 1 | 1 | 1 | 0 |
| 105 | 22 | 105 | 31 | 1 | 1 | 1 | 0 |
| 105 | 31 | 105 | 49 | 0 | 1 | 1 | 0 |
| 105 | 40 | 105 | 40 | 0 | 1 | 1 | 0 |
| 105 | 49 | 105 | 22 | 1 | 1 | 1 | 1 |
| 110 | 15 | 110 | 15 | 1 | 1 | 1 | 1 |
| 110 | 95 | 111 | 95 | 1 | 1 | 1 | 1 |
| 111 | 159 | 110 | 159 | 1 | 1 | 1 | 1 |
| 111 | 223 | 111 | 223 | | | | |

The implementation of interline skipping and interline detour here results in one less pass by scanner and a faster frame

Figure 9F

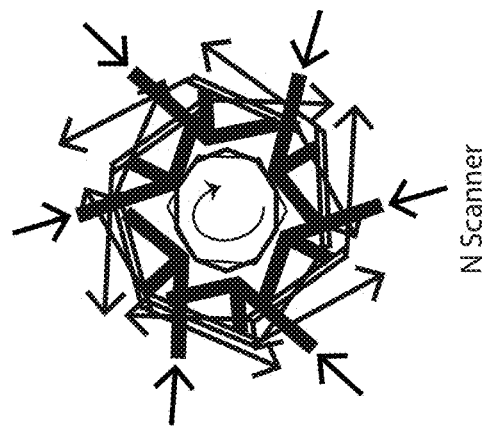
N Scanner
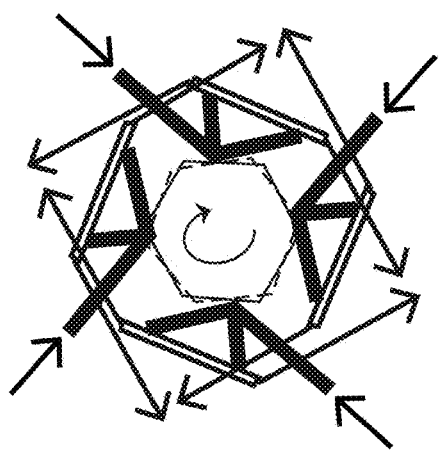
Quad Scanner
Figure 11C
Different Polygon Types
Figure 11D
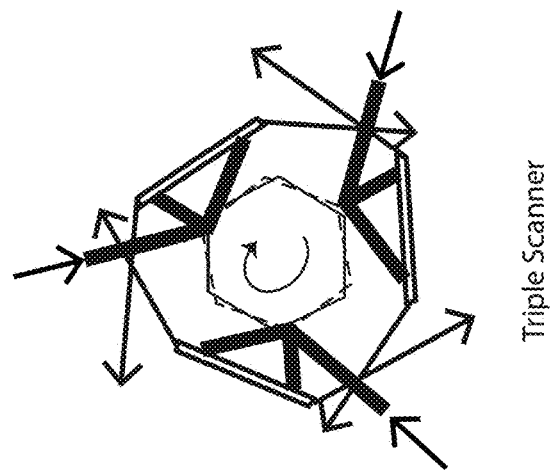
Triple Scanner

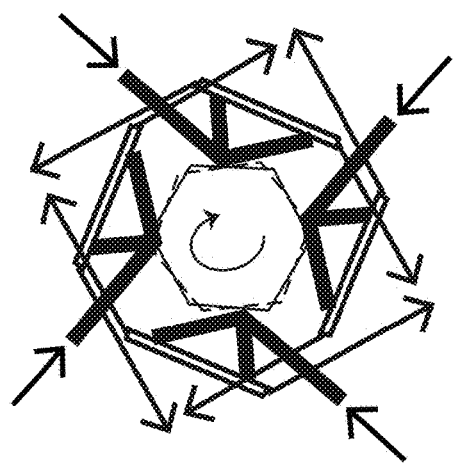
Top View:
N independent scan fields of 20-180 degrees.
(In this example there are 4 scan field of about 110 degrees.)
Figure 11E
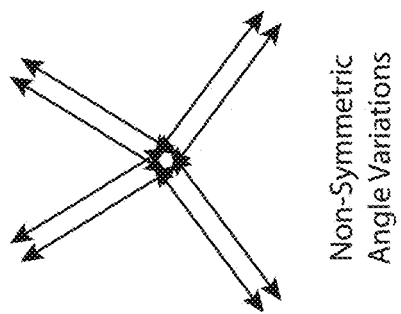
Non-Symmetric Angle Variations
Figure 11F
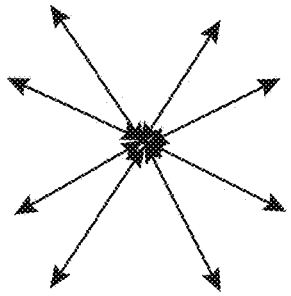
Symmetric Angles

METHOD AND SYSTEM FOR LADAR TRANSMISSION WITH SPIRAL DYNAMIC SCAN PATTERNS

CROSS-REFERENCE AND PRIORITY CLAIM TO RELATED PATENT APPLICATIONS

This patent application claims priority to U.S. provisional patent application Ser. No. 62/038,065, filed Aug. 15, 2014, the entire disclosure of which is incorporated herein by reference.

This patent application is related to the following patent applications: (1) U.S. patent application Ser. No. 14/827,163, entitled "Method and System for Ladar Transmission with Closed Loop Feedback Control of Dynamic Scan Patterns", filed this same day, (2) U.S. patent application Ser. No. 14/827,175, entitled "Method and System for Ladar Transmission with Spinning Polygon Mirror for Dynamic Scan Patterns", filed this same day, (3) U.S. patent application Ser. No. 14/827,182, entitled "Method and System for Ladar Transmission with Interline Skipping for Dynamic Scan Patterns", filed this same day, (4) U.S. patent application Ser. No. 14/827,195, entitled "Method and System for Ladar Transmission Employing Dynamic Scan Patterns with Macro Patterns and Base Patterns", filed this same day, (5) U.S. patent application Ser. No. 14/827,202, entitled "Ladar Point Cloud Compression", filed this same day, and (6) U.S. patent application Ser. No. 14/827,206, entitled "Method and System for Scanning Ladar Transmission with Pulse Modulation", filed this same day, the entire disclosures of each of which are incorporated herein by reference.

INTRODUCTION

It is believed that there are great needs in the art for improved computer vision technology, particularly in an area such as automobile computer vision. However, these needs are not limited to the automobile computer vision market as the desire for improved computer vision technology is ubiquitous across a wide variety of fields, including but not limited to autonomous platform vision (e.g., autonomous vehicles for air, land (including underground), water (including underwater), and space, such as autonomous land-based vehicles, autonomous aerial vehicles, etc.), surveillance (e.g., border security, aerial drone monitoring, etc.), mapping (e.g., mapping of sub-surface tunnels, mapping via aerial drones, etc.), target recognition applications, remote sensing, safety alerting (e.g., for drivers), and the like).

As used herein, the term "ladar" refers to and encompasses any of laser radar, laser detection and ranging, and light detection and ranging ("lidar"). Ladar is a technology widely used in connection with computer vision. In an exemplary ladar system, a transmitter that includes a laser source transmits a laser output such as a ladar pulse into a nearby environment. Then, a ladar receiver will receive a reflection of this laser output from an object in the nearby environment, and the ladar receiver will process the received reflection to determine a distance to such an object (range information). Based on this range information, a clearer understanding of the environment can be obtained by the intelligent logic of a computer vision application. However, conventional ladar solutions for computer vision problems suffer from high cost, large size, large weight, and large power requirements as well as large data bandwidth use. These complicating factors have largely limited their effective use to costly applications that require only short ranges of vision, narrow fields-of-view and/or slow revisit rates.

For example, ladar systems are known in the art where a ladar transmitter illuminates a large number of range points simultaneously. Flash ladar is an example of such a system. However, these conventional systems are believed to suffer from a number of shortcomings. For example, flash ladar systems require a very high energy per pulse laser, which is not only costly but can also be an eye hazard. Furthermore, the read-out integrated circuits for flash ladar systems are typically quite noisy, optically and electronically. Also, the wide field-of-view signal-to-noise ratio (SNR) for flash ladar systems is typically very low, which results in short ranges, thereby detracting from their usefulness.

In an effort to satisfy the needs in the art for improved ladar-based computer vision technology, disclosed herein are a number of embodiments for methods and systems that apply scanning ladar transmission concepts in new and innovative ways. Scanning ladar differs from flash ladar in that scanning ladar sequentially transmits ladar pulses to targeted range points as opposed to employing largely non-targeted flash illumination. While conventional scanning ladar solves many of the problems experienced in connection with flash ladar, conventional scanning ladar systems typically suffer from bulkiness and frame rate limitations. In an effort to provide additional advancements in the art, disclosed herein are improved scanning ladar transmission techniques For example, disclosed herein is a method comprising: (1) processing a shot list, the shot list comprising a plurality of range points for targeting by a scanning ladar transmission system, (2) controlling a spiral dynamic scan pattern for the scanning ladar transmission system by scanning a mirror to a plurality of mirror scan positions based on the processed shot list to target the range points of the processed shot list according to the spiral dynamic scan pattern, wherein the mirror scan positions define where the scanning ladar transmission system is targeted, and (3) transmitting, by the controlled scanning ladar transmission system, a plurality of ladar pulses toward the range points of the processed shot list in accordance with the spiral dynamic scan pattern.

In an example embodiment, the scan positions are scan angles for a movable mirror, whereby the movable mirror rotates around an axis to change its scan angle. However, it should be understood that the scan positions need not be limited to scan angles, and other embodiments may scan the movable mirror in lateral and/or elevation directions to define where the system is targeted.

Also disclosed as an example embodiment is a method comprising translating by a processor a range point list for ladar scanner targeting into a shot list for ladar scanner targeting in a manner whereby the shot list supports a spiral dynamic scan pattern, wherein the range point list comprises a plurality of range points, and wherein the shot list comprises a plurality of ordered range points from the range point list.

With respect to still another example embodiment, disclosed herein is an apparatus comprising a scanning ladar transmission system configured to direct a plurality of ladar pulses toward a plurality of range points via a plurality of scannable mirrors, wherein the scanning ladar transmission system comprises: (1) a beam scanner, the beam scanner including a first mirror and a second mirror, wherein the beam scanner is configured to (i) scan the first mirror to a plurality of mirror scan positions in response to a first driving voltage to target the scanning ladar transmission system along a first axis, and (ii) scan the second mirror to a plurality of mirror scan positions in response to a second driving voltage to target the scanning ladar transmission system along a second axis, and wherein the combination of the mirror scan positions for the first and second mirrors defines the range points to which the scanning ladar transmission system is targeted, and (2) a beam scanner controller, wherein the beam scanner controller is configured to generate the first and second driving voltages for use by the beam scanner such that the first and second driving voltages define a spiral dynamic scan pattern for the scanning ladar transmission system with respect to the range points.

These and other features and advantages of the present invention will be described hereinafter to those having ordinary skill in the art.

BRIEF DESCRIPTION OF THE DRAWINGS

FIG. 9C-F depicts examples of range point list-to-shot list conversions.

FIGS. 11A-G depict example embodiments for beam scanners that employ at least one scanning mirror in combination with a spinning polygon mirror.

DETAILED DESCRIPTION

Figure 1:
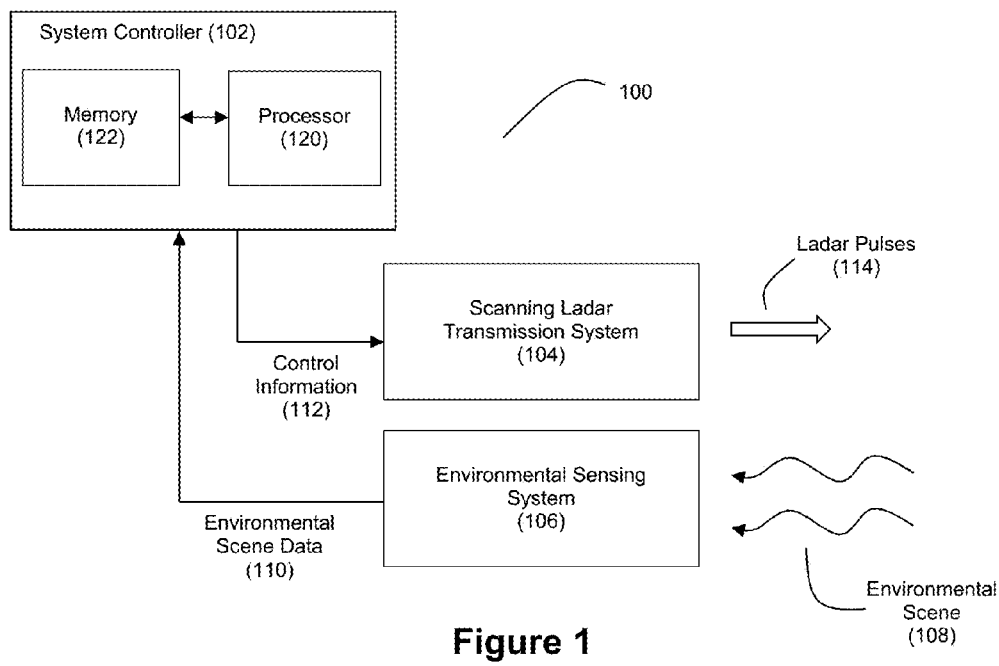
FIG. 1 depicts an example system embodiment.

FIG. 1 illustrates a system 100 for dynamic scanning ladar transmission in accordance with an example embodiment. The system 100 includes a system controller 102 in communication with a scanning ladar transmission system 104 and an environmental sensing system 106. The environmental sensing system 106 can be configured to sense an environmental scene 108 and provide environmental scene data 110 to the system controller 102. Based on an analysis of the environmental scene data 110, the system controller 102 can generate control information 112 for delivery to the scanning ladar transmission system 104. The scanning ladar transmission system, in turn, can transmit ladar pulses 114 in accordance with the control information 112 received from the system controller 102. As explained in further detail below, the scanning ladar transmission system 104 can employ closed loop feedback control of the scan positions for the scanning ladar transmission system 104.

Although not shown, it should be understood that a ladar receiver can be used in combination with the ladar transmission system, wherein the ladar receiver receives reflections of the ladar pulses to support the determination of range information based on the transmitted ladar pulses.

The environmental sensing system 106 can include a sensor that senses data about a nearby environmental scene 108 to generate environmental scene data 110 for delivery to the system controller 102. An example of a suitable sensor includes a camera such as a CCD camera, thermal camera or the like. Another example of a suitable sensor can include another ladar system. The environmental scene data 110 can include frames of image data for the environmental scene generated by a camera, and the environmental sensing system 106 can be configured to generate frames of the environmental scene on a rolling basis for delivery to the system controller 102. As another example, a sensor can be a global positioning system (GPS) receiver and/or Inertial Measurement Unit (IMU) or the like that is capable of determining the geographic position and direction of the environmental sensing system 106. Based on the determined geographic location, a database that includes map information such as a street map and/or a terrain map can be accessed to obtain environmental scene data 110. As such, it should be understood that the environmental scene data 110 can take any of a number of forms, including still images, video images, maps, ladar data, and others such as any accompanying "high value target data" corresponding to high value locations within the environmental scene data to be queried.

In an example embodiment, for an initial scan, the environmental sensing system can use a sensor such as a camera to generate the environmental scene data, but additional scans can employ, as the environmental scene data 110, 3D image data generated from the data received by a laser range receiver in response to the ladar pulses sent by the scanning ladar transmission system.

The system controller 102 can include a processor 120 and memory 122. The processor 120 and memory 122 can be configured to interact with each other such that the processor 120 executes instructions stored in memory 122. The processor 120 may be any type processor with sufficient computational capabilities to implement the processing operations described herein. It should be understood that processor 120 may comprise multiple processors, optionally distributed via a network. The programming instructions for implementing the processing logic executed by the processor 120 may be resident on a non-transitory computer-readable storage medium (e.g., memory 122) for access and execution by the processor 120. It should also be understood that the memory 122 may comprise multiple memory devices, which may be multiple distributed memory devices and/or memory devices of different types, including but not limited to one or more hard drives, random access memories (RAMs), removable storage media such as flash drives, optical media, and the like, etc. The memory 122 may also store a plurality of data structures that reflect any information computed by the processor, such as lists of selected range points, shot lists, etc. as described below. A data structure may be a physical manifestation of information organized within a computing system. Examples of data structures may include data objects, files, records, tables, arrays, trees, and the like.

In operation, the processor 120 can process the environmental scene data 110 received from the environmental sensing system 106 to generate control information 112 that will govern the operation of the scanning ladar transmission system 104. This control information 112 may include targeting information that defines where the scanning ladar transmission system 104 will send its ladar pulses 114, examples of which are provided in the description below.

The scanning ladar transmission system 104 is configured to controllably transmit ladar pulses 114 to desired targets based on the control information 112 received from the system controller 102. The scanning ladar transmission system 104 can be configured to scan to a desired target via one or more movable mirrors that can direct a ladar pulse to the desired target. Examples of scanning ladar transmission systems 104 are included in the description that follows.

Figure 2A:
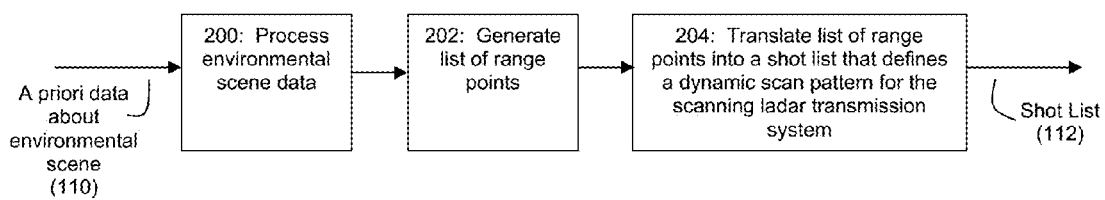
FIG. 2A depicts an example process flow implemented by the system controller of FIG. 1.

System Controller 102—Configuration and Operation:

FIG. 2A depicts a general process flow for execution by processor 120 to generate control instructions 112 (a shot list in this example) from input environmental scene data 110. The data 110 serves as a priori data about the environmental scene 108 that will be processed by the processor 120 at step 200. Based in this processing, the processor generates a list of range points for targeting with the scanning ladar transmission system 104 (step 202). This list can be generated by selecting a subset of possible range points, where the selected range points then serves as a sparse array or point cloud that represents salient features of the environmental scene to be targeted by the scanning ladar transmission system 104. In an example where the a priori data 110 is an image, the sparse array that serves as the list of selected range points can be a subset of the pixels in the a priori image data 110.

Next, at step 204, the processor 120 translates the list of range points generated by step 202 into a shot list for the scanning ladar transmission system 104. This shot list can serve as the control information 112 for the scanning ladar transmission system 104. While the list of range points generated at step 202 can be merely a list of selected range points for targeting, the shot list serves as an ordered list of the selected range points for targeting by the scanning ladar transmission system, where the ordering takes into consideration the capabilities and limitations of the scanning ladar transmission system 104 as well as a desired scan pattern for the system operation. While the example of FIG. 2A shows step 204 being performed by processor 120, it should be understood that step 204 could be performed by other components in the system. For example, step 204 could be performed by a beam scanner controller 308 within the scanning ladar transmission system 104. As another example, processor 120 can be configured to perform a portion of step 204 while beam scanner controller 308 could be configured to perform the remaining portion of step 204. For an example embodiment where step 204 is performed by processor 120, then the control information 112 can include the shot list. However, for an example embodiment where step 204 is performed by the beam scanner controller 308 within the scanning ladar transmission system 104, then the control information 112 can include the range point list from step 202.

Figure 2B:
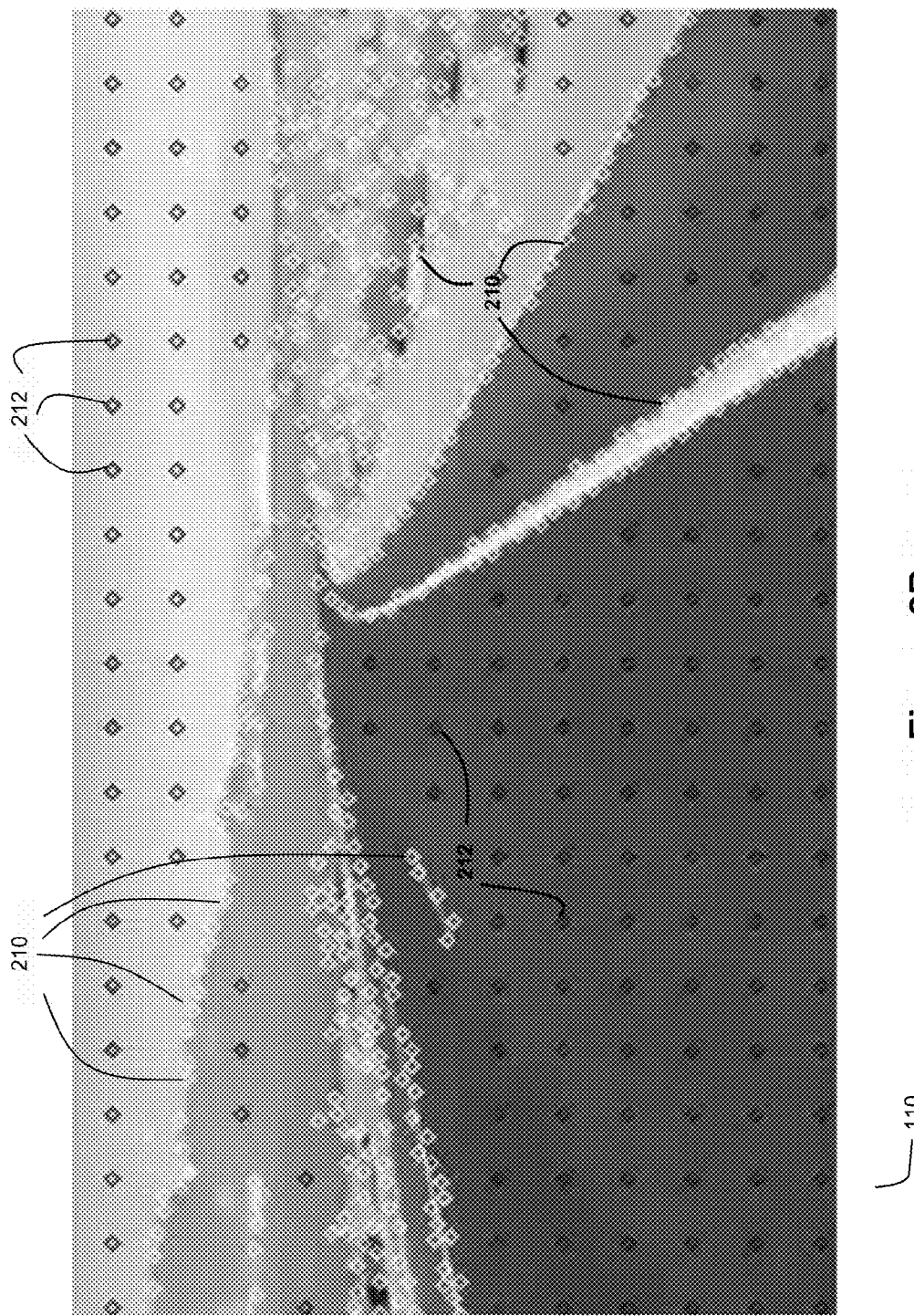
FIG. 2B depicts an example environmental scene image that includes selected range points for ladar targeting.

FIG. 2B depicts an example that shows the results of step 202 for a sample image of an environmental scene. In this example, the environmental scene data 110 shows a road and nearby topographical scenery. The processor at step 202 can select a plurality of intelligent range points 210 and a plurality of fill range points 212 to be included in the range point list. As explained below, intelligent range points are range points that are found by the system to exhibit a high utility for the purposes of critically sampling a scene, while fill range points are range points that provide scaffolding for the detail of the intelligent range points. Together, these points 210 and 212 can define the sparse array of range points. By reducing the size of the point array used to represent the environmental scene, it is believed that a scanning ladar transmission system can support higher frame rates because it will be able to scan an environmental scene more quickly due to the reduced point load on the scanning ladar transmission system. It is further believed that the sparse array may also support improved range for the ladar system primarily because the laser could operate with a lower repetition rate, in which case the laser can exhibit a higher amount of energy per pulse (which would in turn translate into longer ranges supported by the system). It is expected that example embodiments will be capable of ranging up to distances of around 2 km or even higher (e.g., around 10 km).

The intelligent range points 210 can be selected based on any of a number of criteria. For example, areas of high contrast can be deemed to be areas of interest for the system that should include a relatively high concentration of range points. Thus, step 202 can operate to intelligently select a high concentration of range points in areas of high contrast based on an analysis of the image data 110. This is shown by the example of FIG. 2B where the intelligent range points 210 are concentrated in relatively high contrast areas of the image such as the shoulder boundary for the road, the break between the road and non-road terrain, and the horizon boundary between the distant mountains and sky. Additional criteria that can be used to identify salient range points are images areas that exhibit lines or corners. To flesh out other portions of the image 110, the processor 202 can define a fill pattern and select fill range points 212 based on the defined fill pattern. Furthermore, a practitioner may choose to employ additional stereoscopic 3D information or structure from motion algorithms to supplement the sparse array with additional range points.

Figure 2C:
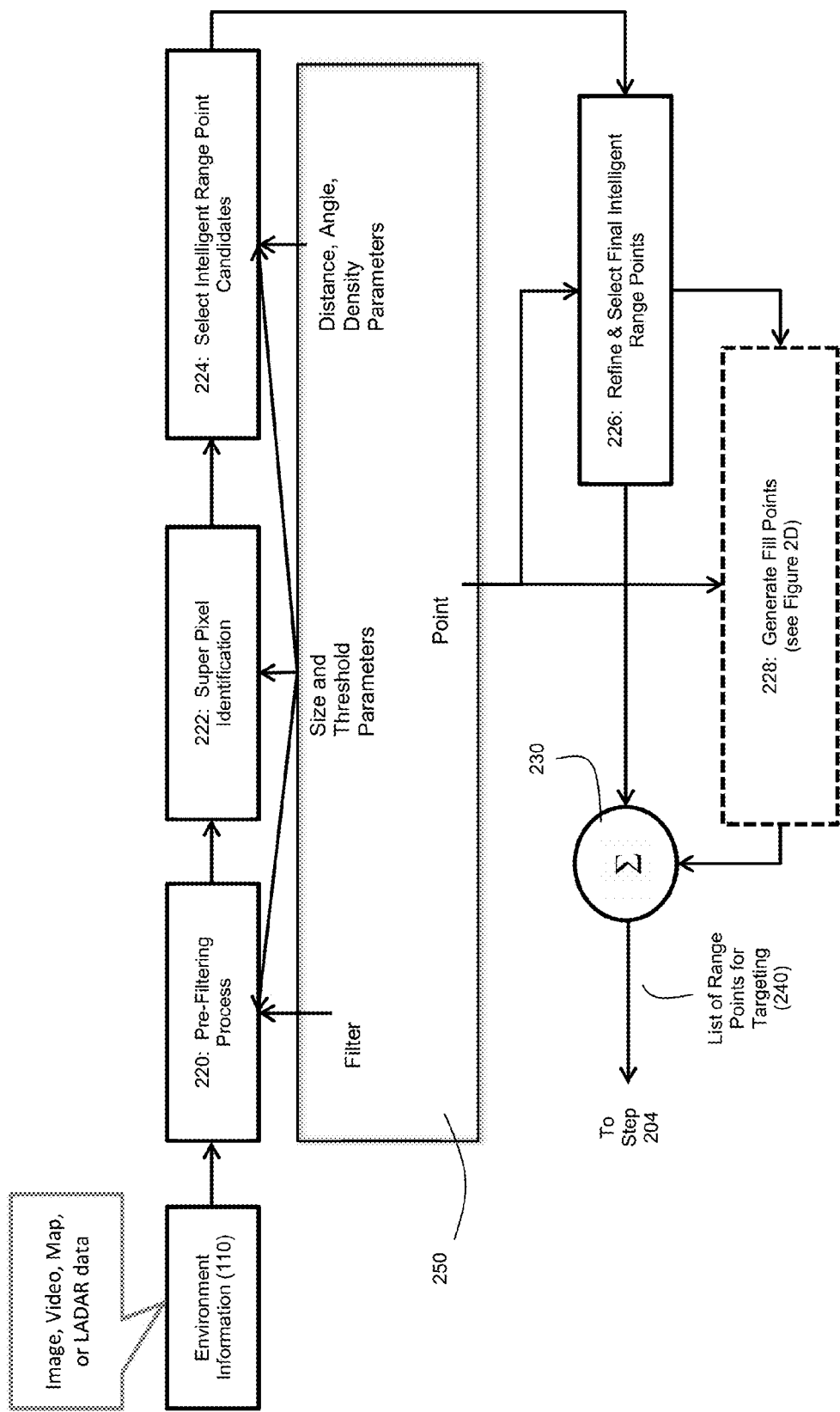
FIG. 2C depicts an example embodiment for a dynamic range point selection algorithm.
Figure 2D:
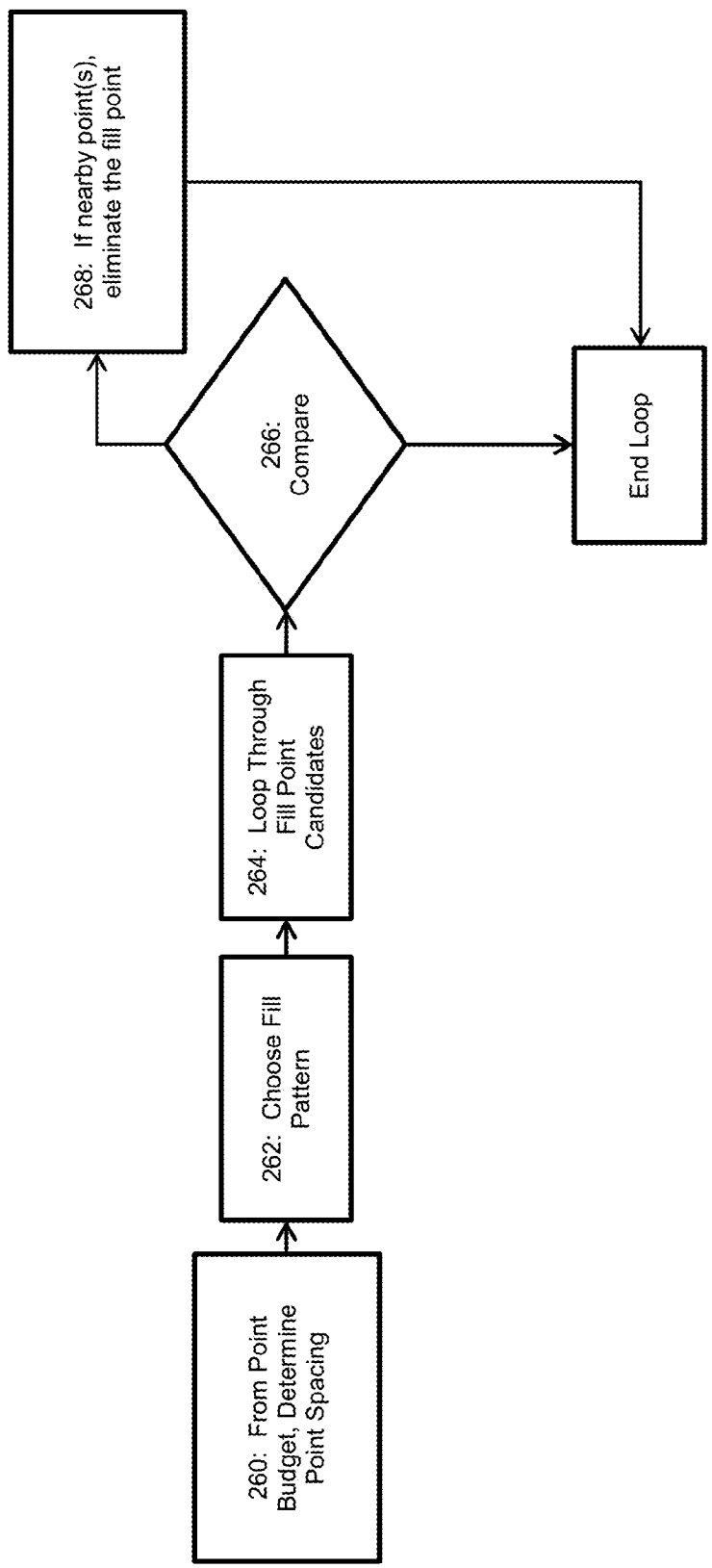
FIG. 2D depicts an example embodiment for a fill point selection algorithm of an exemplary dynamic range point selection algorithm.

An example process flow for the dynamic selection of intelligent range points and fill range points can be seen in FIGS. 2C and 2D. It should be understood that FIGS. 2C and 2D generally correspond to steps 200 and 202 from FIG. 2A. With reference to FIG. 2C, at step 220, the processor applies a pre-filtering process to the environmental scene data 110. For this example, the environmental scene data can be an image. The pre-filtering process can be designed to suppress high frequency noise or other unwanted artifacts in the image. The pre-filtering process may also include an edge detection operation to identify areas of high contrast in the image 110. The processor can apply any of a plurality of selectable filter operations to perform step 220. The selection of appropriate filters can be controlled by a filter select parameter, where the filter select parameter can be included as a set of parameters 250 that are used to control the range point selection. Parameters 250 can be defined based on user input or a feedback algorithm that optimizes the parameters based on data from the environmental sensing system, other sensors (such as GPS, IMU), and/or a macro operation mode set by the user.

At step 222, the processor may identify super pixels for the image 110. In doing so, the processor is able to break the image 110 into natural or smaller segments. Parameters 250 that can be used at step 222 to control the identification of super pixels can include a size parameter and a threshold parameter. Any of a number of image segmentation algorithms can be used in the performance of step 222, including but not limited to simple linear iterative clustering (SLIC) segmentation, QuickShift segmentation, TurboPixels segmentation, normalized cuts segmentation, and/or graph-based segmentation. Size and threshold parameters 250 can be used to control the nature of the segmentation at step 222. By breaking the image 110 into natural or smaller segments using super pixel segmentation techniques, intelligent range points can then be identified as a result of processing each natural/smaller segment which is expected to enhance and improve range point selection and ultimately 3D scene interpretation and reconstruction. Next, at step 224, the processor selects candidates for intelligent range points to be included in the list of range points. Thus, the output of step 226 represents the list of intelligent range points that have been selected for ladar scanning Step 224 can be performed on a segment-by-segment basis with respect to the super pixel segments found as a result of step 222. Any of a number of techniques can be used in the performance of step 224. For example, techniques that are effective to identify points corresponding to edges, and corners in an image can be employed. An example of an open source method that can be employed in this regard is the use of the Harris Corner Detector open source algorithm included in the OpenCV library. However, it should be understood that other techniques and tools are available for implementing step 224, such as the Shi Tomasi algorithm, the Features from Accelerated Segment Test (FAST) algorithm, the Smallest Univalue Segment Assimilating Nucleus (SUSAN) algorithm, and other corner detection algorithms. Parameters 250 that can be used at step 224 to control the initial selection of intelligent range points can include distance parameters, angle parameters, and density parameters. The distance parameters define different spacing parameters between types of points such as corner points. The distance parameter can be expressed in units of pixels. Spacing for the distance parameters may also be a function of range, in which case the distance parameters may change as a function of previous image frames and previous range information. The angle parameters are used to make spacing a function of azimuth and/or elevation. For example, at larger angles, it may be better to reduce spacing between points. The density parameters are other types of spacing parameters that can mostly be used as upper or lower limits for some distance values.

At step 226, the processor refines the list of selected intelligent range points from step 224 to make a final selection of intelligent range points. As part of this operation, step 226 can utilize a parameter 250 that defines a point budget for the list of range points. This point budget can identify a maximum number of range points for the list of range points. The value for the point budget parameter can be any of a number of values depending upon the desires of a practitioner. As an example, the point budget can be around 0.3% to around 3.0% of the number of pixels in the image data 110. However, it should be understood that other values or metrics for expressing the point budget can be used.

In a simple example embodiment, step 226 can be configured to consider the point budget parameter 250 and operate to (1) select all intelligent range point candidates for inclusion in the final range point list if the number of intelligent range point candidates is less than the point budget or a defined portion thereof (in which case the remainder relative to the point budget or point budget portion is allocated for fill range points), and (2) reduce the number of intelligent range points selected at step 224 so as to comply with the point budget or defined portion thereof.

In another example embodiment, step 226 can adjust and/or augment the intelligent range point candidates when selecting the intelligent range points for inclusion in the list. For example, some intelligent range point candidates might be shifted up, down, left, or right by some distance depending on predictive algorithms that may be employed during refinement. As another example, in the case of edge points, one or more additional intelligent range points might be added on either side of an intelligent range point candidate corresponding to an edge in order to better define the edge. In the case of corner points one or more additional points may surround the corner points. And still another example additional range points may surround points corresponding to moving objects such as pedestrians in the case of a vehicle application.

Still further, step 226 can also be configured to take into account the configuration of the scanning ladar transmission system 104 with respect to its dynamic scan pattern. As explained below, the scanning ladar transmission system 104 can be configured to perform scans of range points using any of a number of dynamic scan patterns, where each dynamic scan pattern may exhibit different characteristics where performance can be improved by altering the selection of intelligent range points. For example, for a given type of scanner, it may be better to step down on intelligent range point to the next row if doing so would avoid a line skip and the stepping down of the intelligent range point would be compliant with one of the density parameters that controls the upper limit on how many pixels away a point can shift without impacting its selection (that is, if the pixel slightly below the originally chosen pixel candidate will perform just as well, then the adjustment can be made to improve scanning performance).

At step 228, the processor generates a set of fill range points that fill out the list of range points for ladar scanning FIG. 2D illustrates an example process flow for performing step 228. As shown in FIG. 2C, the point budget parameter will help govern the operation of step 228.

At step 230, the processor combines the list of intelligent range points from step 226 and the list of grid range points from step 228 to create the list of range points 240 to be used for ladar scanning. This list 240 generally corresponds to the output of step 202 from FIG. 2A. Each range point on list 240 can be expressed in terms of a location information such as a row and column number for the location of that point within image 110.

FIG. 2D describes the operation of step 228 in greater detail. At step 260, the processor determines a desired spacing between fill range points. This determination is affected by the defined point budget. For example, if the point budget is X, and the operation of step 226 results in the selection of Y intelligent range points (where Y<X), the process flow of FIG. 2D will have a budget of X-Y to work with when selecting fill range points. The value of X-Y, in turn, will influence the determined spacing between fill range points at step 260. Additional factors that can affect the operation of step 260 include the scan pattern dynamics (such as the minimal spacing permitted between consecutive shots).

At step 262, the processor chooses a fill pattern for the fill range points. Examples of fill patterns that can be chosen at step 262 include square grid patterns, diamond grid patterns, and staggered grid patterns (in which case, there are multiple square grids, but each successive grid row has an offset from the previous grid column or row depending on which one corresponds to the fast axis). Fill pattern selection can choose an optimal fill pattern for the point spacing determined at step 260. The fill pattern selection may also take into consideration environmental factors as determined from the image 110. For example, if the image is an overhead view of the ground, this fact might influence the selection of a particular fill pattern, while if the image is a horizon view that includes both the ground and the sky, this fact might influence the selection of a different fill pattern. The fill pattern may also be translated and wrapped (effectively a 3D rotation in 2D) horizontally and/or vertically from frame to frame such that after N number of frames, all addressable pixels within the space of possible fill points will be chosen. Once the fill pattern has been chosen, step 262 is able to generate a list of candidate fill points based on the chosen fill pattern and the determined point spacing.

Also, it should be understood that different fill patterns can be chosen for different segments of the image 110. As noted, at step 222, the processor identifies different image segments that the image 110 can be broken into. Thus, at step 262, different fill patterns can be applied to different segments of the image 110. For example, the fill pattern for an image segment above the horizon may have a lower fill density than an image segment below the horizon.

At step 264, the processor loops through the candidate fill points. At step 266, a comparison is made between each candidate fill point and the selected intelligent range points from step 226. If there is a selected intelligent range point within a defined threshold distance of the candidate fill point, then that candidate fill point can be eliminated (step 268). Otherwise, the candidate fill point is retained. The defined threshold distance for this comparison operation can be a parameter that is defined in response to user input or an AI algorithm. The looping started at step 264 terminates at step 268 after each candidate fill point has been considered for retention at step 266. Thus, upon completion of the FIG. 2D process flow, the processor has defined the list of fill range points for ladar scanning.

Figure 9A:
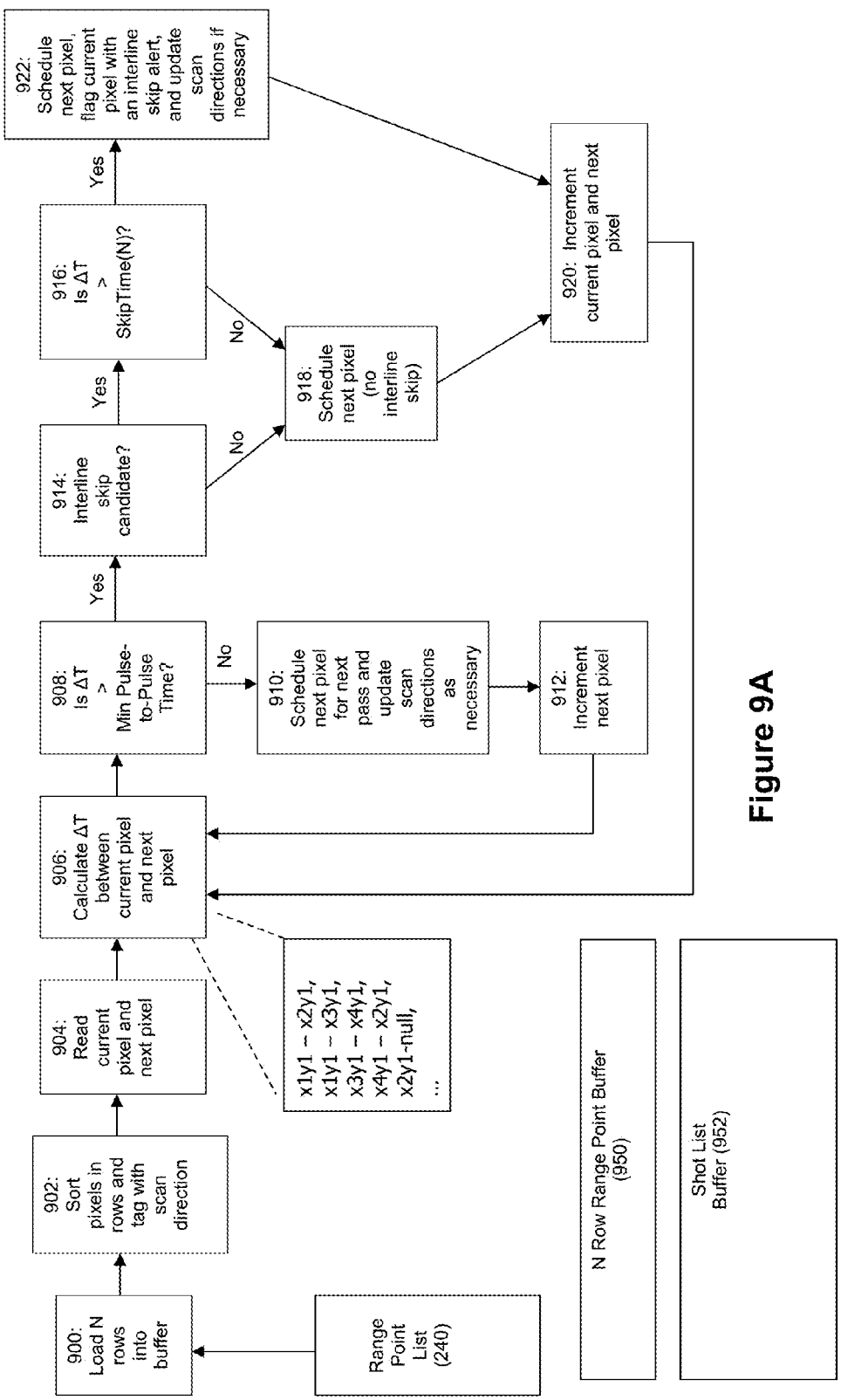
FIG. 9A depicts an example embodiment for converting a list of range points into a shot list for ladar targeting.

FIG. 9F depicts an example range point list 240 that can be generated as a result of the operation of FIGS. 2C and 2D. In the example of FIG. 9F, each selected range point is defined by a row number (left side) and a column number (right side). It should be understood that this list can be a simple raw list of range points. If desired, a practitioner can further process the range point list to impose an order to the range points with respect to the dynamic scan pattern that will be employed by the scanning ladar transmission system 104. That is, each range point on the range point list can be placed in a sequence with the other range points on the list that will define the shot order of range points for the scanning ladar transmission system 104. As explained, this translation of a range point list to a shot list can be performed at step 204 by the processor. As noted, the shot list defines an order for the range points to be shot by the scanning ladar transmitter system 104. FIGS. 9A-9F, discussed in greater detail below, depict examples of process flows that can be used for translating a range point list 240 into a shot list.

FIG. 9F also shows an example shot list 950 generated from a range point list 240. In this example, the order is defined with a top down order where the range points that are higher on the shot list will be shot prior to the range points that are lower on the shot list (e.g., the range point at row ("Srow") 104, column ("SCol") 19 will be shot before the range point at row ("Srow") 104, column ("SCol") 26, and so on). The leftmost and middle columns define the row number and column number, respectively, for a given range point on the shot list. The other columns in the shot list table provide additional control information for the scanning ladar transmitter system 104, as explained below in connection with FIGS. 9A-F. The example shot list of FIG. 9F also includes fill shots that are added at step 204 due to factors such as a minimum spacing parameter for the transmission laser.

The example shot list of FIG. 9F can serve as the control information 112 that is provided to the scanning ladar transmission system 104 to govern its operation. While the example embodiments of FIGS. 2C and 9F describe an arrangement where the range points on the shot list are delivered to the scanning ladar transmission system 104 as a batch, it should be understood that the shots in the shot list could alternatively be communicated to the scanning ladar transmission system on a rolling basis where each shot is passed to the scanning ladar transmission system once it is identified. Thus, the shot list can be delivered to the scanning ladar transmission system 104 and processed thereby in both a batch mode and a rolling mode.

Figure 3:
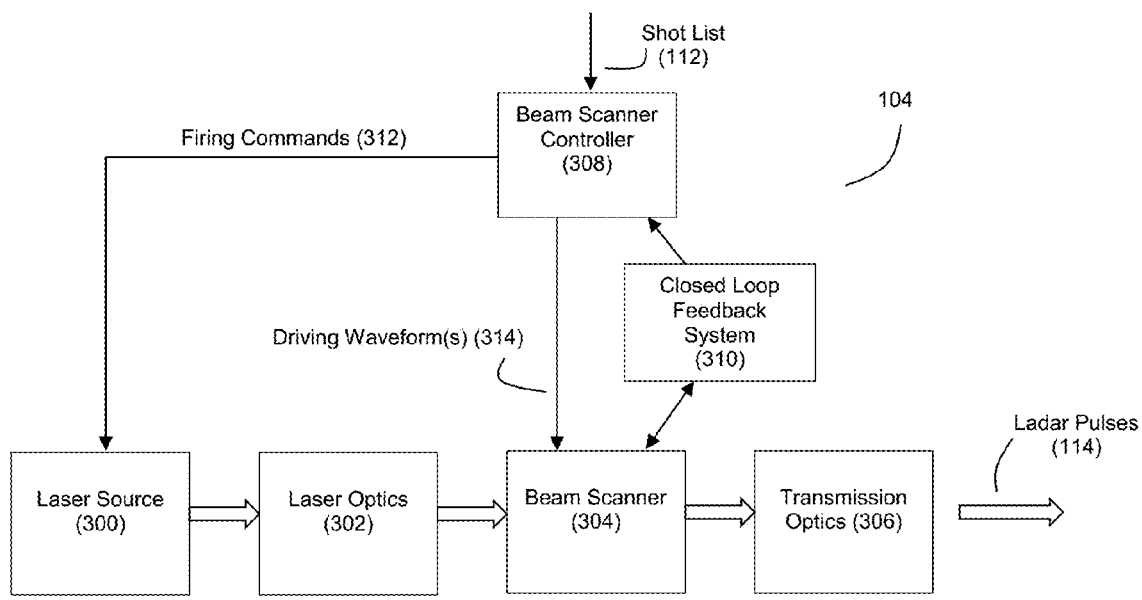
FIG. 3 depicts an example embodiment for a scanning ladar transmission system.

Scanning Ladar Transmission System 104:

FIG. 3 depicts an example embodiment for a scanning ladar transmission system 104. The system 104 can include a laser source 300 in optical alignment with laser optics 302, a beam scanner 304, and transmission optics 306. These components can be housed in a packaging that provides a suitable shape footprint for use in a desired application. For example, for embodiments where the laser source 300 is a fiber laser or fiber-coupled laser, the laser optics 302, the beam scanner 304, and any receiver components can be housed together in a first packaging that does not include the laser source 300. The laser source 300 can be housed in a second packaging, and a fiber can be used to connect the first packaging with the second packaging. Such an arrangement permits the first packaging to be smaller and more compact due to the absence of the laser source 300. Moreover, because the laser source 300 can be positioned remotely from the first packaging via the fiber connection, such an arrangement provides a practitioner with greater flexibility regarding the footprint of the system.

Based on the control information 112, such as a shot list as generated at step 204 of FIG. 2A, a beam scanner controller 308 can be configured to control the nature of scanning performed by the beam scanner 304 as well as control the firing of the laser source 300. A closed loop feedback system 310 is employed with respect to the beam scanner 304 and the beam scanner controller 308 so that the scan position of the beam scanner 304 can be finely controlled, as explained below.

The laser source 300 can be any of a number of laser types suitable for ladar pulse transmissions as described herein.

For example, the laser source 300 can be a pulsed fiber laser. The pulsed fiber laser can employ pulse durations of around 1-4 ns, and energy content of around 0.1-100 µJ/pulse. The repetition rate for the pulsed laser fiber can be in the kHz range (e.g., around 1-500 kHz). Furthermore, the pulsed fiber laser can employ single pulse schemes and/or multi-pulse schemes (see FIGS. 12A and 12B). However, it should be understood that other values for these laser characteristics could be used. For example, lower or higher energy pulses might be employed. As another example, the repetition rate could be higher, such as in the 10's of MHz range (although it is expected that such a high repetition rate would require the use of a relatively expensive laser source under current market pricing).

As another example, the laser source 300 can be a pulsed IR diode laser (with or without fiber coupling). The pulsed IR diode laser can employ pulse durations of around 1-4 ns, and energy content of around 0.01-10 µJ/pulse. The repetition rate for the pulsed IR diode fiber can be in the kHz or MHz range (e.g., around 1 kHz-5 MHz). Furthermore, the pulsed IR diode laser can employ single pulse schemes and/or multi-pulse schemes (see FIGS. 12A and 12B).

The laser optics 302 can include a telescope that functions to collimate the laser beam produced by the laser source 300. Laser optics can be configured to provide a desired beam divergence and beam quality. As example, diode to mirror coupling optics, diode to fiber coupling optics, and fiber to mirror coupling optics can be employed depending upon the desires of a practitioner.

The beam scanner 304 is the component that provides the system 104 with scanning capabilities such that desired range points can be targeted with ladar pulses. The beam scanner receives an incoming ladar pulse from the laser source 300 (by way of laser optics 302) and directs this ladar pulse to a desired downrange location (such as a range point on the shot list) via reflections from movable mirrors. Mirror movement can be controlled by a driving voltage waveform 314 received from the beam scanner controller 308. Any of a number of configurations can be employed by the beam scanner 304. For example, the beam scanner can include dual microelectromechanical systems (MEMS) mirrors, a MEMS mirror in combination with a spinning polygon mirror, or other arrangements. An example of suitable MEMS mirrors are single surface tip/tilt/piston MEMS mirrors. By way of further example, in an example dual MEMS mirror embodiment, a single surface tip MEMS mirror and a single surface tilt MEMS mirror can be used. However, it should be understood that arrays of these MEMS mirrors could also be employed. Also, the dual MEMS mirrors can be operated at any of a number of frequencies. For example, if a first MEMS mirror is acting as a fast axis mirror and a second MEMS mirror is acting as a slow axis mirror, the ratio of resonant frequencies between the second and first MEMS mirrors can fall in a range of around 1:5 to around 1:9 However, a practitioner may choose to employ different ratios. As another example of other arrangements, a miniature galvanometer mirror can be used as a fast-axis scanning mirror. As another example, an acousto-optic deflector mirror can be used as a slow-axis scanning mirror. Furthermore, for an example embodiment that employs the spiral dynamic scan pattern discussed below, the mirrors can be resonating galvanometer mirrors. Such alternative mirrors can be obtained from any of a number of sources such as Electro-Optical Products Corporation of New York. As another example, a photonic beam steering device such as one available from Vescent Photonics of Colorado can be used as a slow-axis scanning mirror. As still another example, a phased array device such as the one being developed by the DARPA SWEEPER program could be used in place of the fast axis and/or slow axis mirrors.

Also, in an example embodiment where the beam scanner 304 includes dual mirrors, the beam scanner 304 may include relay imaging optics between the first and second mirrors, which would permit that two fast axis mirrors be used (e.g., two small fast mirrors as opposed to one small fast mirror and one long slower mirror).

Figure 5:
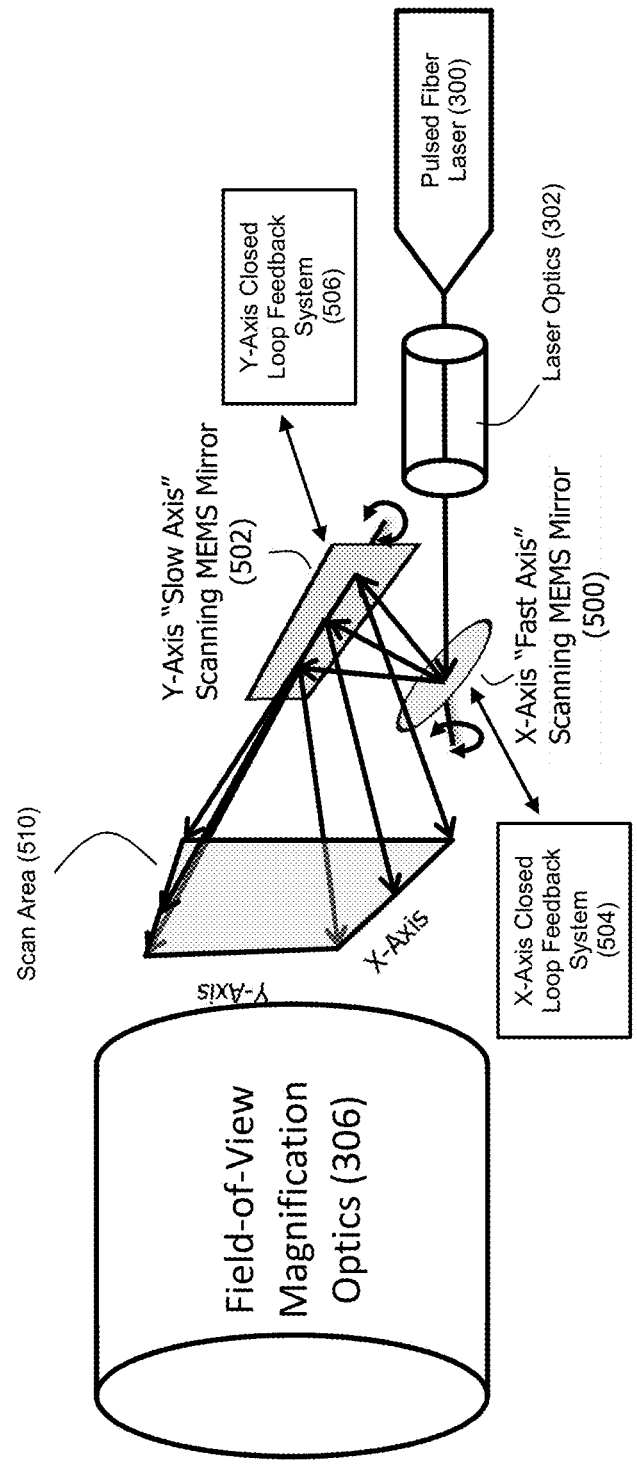
FIG. 5 depicts an example embodiment of a beam scanner in combination with closed feedback control of mirror scan positions.

The transmission optics 306 are configured to transmit the ladar pulse as targeted by the beam scanner 304 to a desired location through an aperture. The transmission optics can have any of a number of configurations depending upon the desires of a practitioner. For example, the environmental sensing system 106 and the transmitter 104 can be combined optically into one path using a dichroic beam splitter as part of the transmission optics 306. As another example, the transmission optics can include magnification optics (an example of which is shown in FIG. 5). Further still, an alignment pickoff beam splitter can be included as part of the transmission optics 306.

Beam Scanning Configuration and Control:

The beam scanner controller 308 can provide one or more voltage waveforms 314 to the beam scanner 304 that will drive the mirrors of the beam scanner to a desired scan position (e.g., scan angle). Given the high oscillation rates of the movable mirrors within the beam scanner 304, a fine degree of control over the beam scanner's scan positions is desirable. With respect to an example embodiment where a first mirror of the beam scanner 304 serves to rotate over a first axis at a relatively high speed (the "fast axis") while a second mirror of the beam scanner 304 serves to rotate over a second axis orthogonal to the first axis at a relatively slower speed (the "slow axis"), slight errors in mirror positioning when the ladar pulses are incident to the mirrors can cause significant degradation in system performance.

Figure 4A:
FIGS. 4A-C depicts how positioning errors with respect to the scanning mirrors of a beam scanner can affect the useable scan area for ladar targeting.
Figure 4B:
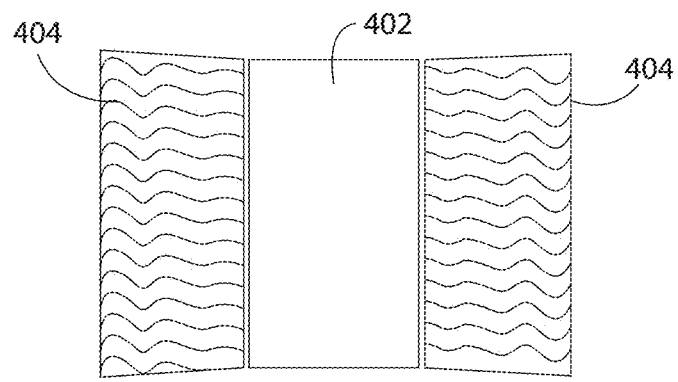
Figure 4C:
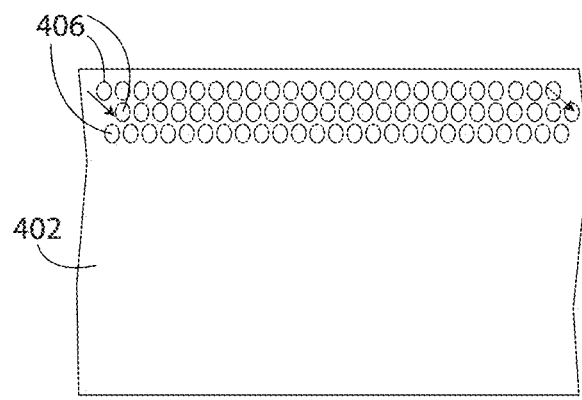

FIGS. 4A-4C illustrate this phenomenon. FIG. 4A depicts a desired scan area 400 for the beam scanner 304. However, as shown by FIG. 4B, without fine slow-axis control (the Y-axis in this example), the useable scan area 402 shrinks relative to scan area 400 as the areas 404 are required for the Y axis mirror to settle down during rotation. Furthermore, this settling time may increase as a function of the number of lines to be skipped in a dynamic scan pattern, although even with no line skipping, settlement time considerations still apply. Further still, as shown by FIG. 4C, with respect to the fast axis (the X-axis in this example), phase shifts in the targeted range points 406 can occur that cause waviness and other artifacts in the scan area if fine control over the scan position of the fast axis mirror is not achieved.

As a solution to these problems, a closed loop feedback system 310 can be employed to provide fine control over the scan position of at least one mirror employed by the beam scanner 304. The beam scanner controller 308 can then use the feedback information from the closed loop feedback system to adjust at least one of the mirror driving waveforms 314 and thereby achieve finer control over mirror positioning. In a preferred embodiment, this feedback control is employed with respect to both mirrors of the beam scanner 304.

FIG. 5 depicts an example embodiment for a beam scanner 304 in combination with closed loop feedback. In this example, the beam scanner 304 includes dual MEMS mirrors. A Y-axis MEMS mirror 500 is positioned to receive an incident laser pulse from the laser source 300 by way of laser optics 302. The X-axis MEMS mirror 500 will reflect this laser pulse to the Y-axis scanning MEMS mirror 502. It should be understood that this reflection can be a direct reflection or an indirect reflection whereby the beam reflected from the X-axis MEMS mirror passes through relay imaging optics such as a unity magnification telescope on its way to the Y-axis MEMS mirror 502. The Y-axis MEMS mirror 502 is positioned to receive the reflected laser pulse from mirror 500 and further reflect this laser pulse to a location within the scan area 510 corresponding to the range point on the shot list that is being targeted by the beam scanner 304.

The MEMS mirrors 500 and 502 are controllably rotatable around their respective axes of rotation. The X-axis MEMS mirror 500 will be rotatable to control the position of the ladar pulse within the scan area 510 along the scan area's X-axis, while the Y-axis MEMS mirror 502 will be rotatable to control the position of the ladar pulse within the scan area 510 along the scan area's Y-axis. Thus, the combined positioning of mirrors 500 and 502 along their respective axes of rotation when the laser pulse strikes each mirror will be effective to direct the laser pulse to the desired location within the scan area 510. In this example embodiment the X-axis MEMS mirror 500 can be rotated at a relatively higher rate than the Y-axis MEMS mirror 502, hence the reference to the X-axis MEMS mirror as the fast axis mirror and the reference to the Y-axis MEMS mirror as the slow axis mirror.

It should be understood by a practitioner that the designation of the fast axis as the X-axis and the slow axis as the Y-axis is arbitrary as a 90 degree turn in position for the system would render the X-axis as the slow axis and the Y-axis as the fast axis. Furthermore, in an example embodiment, the fast axis mirror is smaller than the slow axis mirror in terms of mirror area and is also positioned upstream from the slow axis mirror (that is, the fast axis mirror receives the ladar pulse and reflects it to the slow axis mirror for transmission toward the targeted range point). However, this configuration could be changed for other embodiments. For example, while making the slow axis mirror larger than the fast axis mirror provides a benefit in terms of permitting a larger scan area, for embodiments where a decrease in the size of the scan area is permissible, the slow axis mirror could be the same size or even smaller than the fast axis mirror. As another example, if the fast axis mirror were downstream from the slow axis mirror, re-imaging optics, such as relay imaging optics, could be used between the two mirrors to support such an arrangement.

Furthermore, the transmission optics 306 can be configured to provide field of view magnification of the directed laser pulse.

An X-axis closed loop feedback system 504 can be used to achieve fine control over the positioning of the X-axis MEMS mirror 500. A Y-axis closed loop feedback system 506 can be used to achieve fine control over the positioning of the Y-axis MEMS mirror 502. As indicated above, while it is preferable to employ feedback control over both the X-axis and Y-axis mirrors 500 and 502, it is believed that improvements in performance relative to an open loop, no feedback design can still be achieved through application of feedback control to only one of the mirrors. For example, a practitioner might choose to employ only the Y-axis feedback control system 506. As another example, a practitioner might choose to employ only the X-axis feedback control system 504.

Figure 6A:
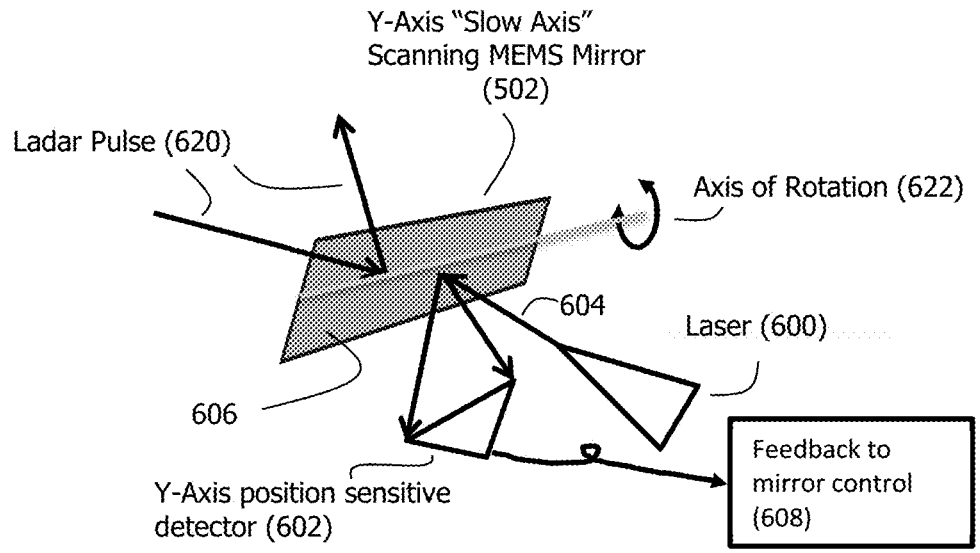
FIGS. 6A-C depicts example embodiments for closed loop optical feedback systems for use to finely control mirror scan positions.

FIG. 6A depicts an example embodiment for how closed feedback control can be implemented for the Y-axis mirror 502. In this example, the closed loop feedback control is closed loop optical feedback control. Mirror 502 rotates around the axis of rotation 622 to direct an incident ladar pulse 620 in a desired manner via reflection off the frontside of the mirror 502. A laser 600 be targeted at a backside 606 of the mirror 502. The laser 600 can be any type of laser suitable for position detection. For example, laser 600 can be a pulsed or continuous wave (CW) visible diode laser. Laser 600 can exhibit a variable pulse width and produce power in the uW to mW range.

The laser beam 604 produced by laser 600 will be reflected off the backside 606 of mirror 502, and a Y-axis position sensitive detector 602 can be positioned to receive this reflection. The detector 602 can be a single axis position sensing detector. The angular position of mirror 502 with respect to axis of rotation 622 will affect where the reflected laser beam 604 is received by the detector 602. Thus, the position detector 602 will be able to sense data indicative of the actual position of mirror 502. This sensed data can then be fed back via 608 for improved Y-axis mirror control.

Figure 6B:
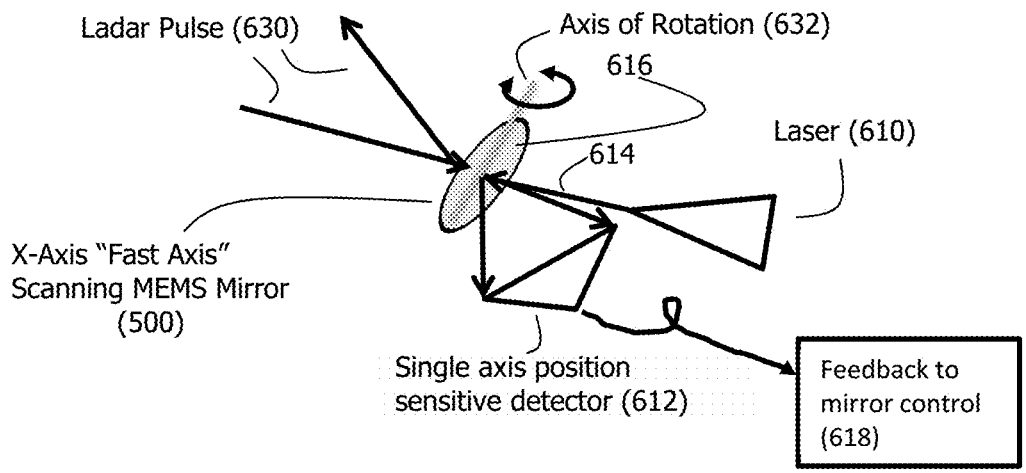

FIG. 6B depicts an example embodiment for how closed feedback control can be implemented for the X-axis mirror 500, and operates in the same fashion as the example of FIG. 6A. Mirror 500 rotates around the axis of rotation 632 to direct an incident ladar pulse 630 in a desired manner via reflection off the frontside of the mirror 500. A laser 610 be targeted at a backside 616 of the mirror 500. Laser 610 can be a laser similar to laser 600.

The laser beam 614 produced by laser 610 will be reflected off the backside 616 of mirror 500, and an X-axis position sensitive detector 612 can be positioned to receive this reflection. The angular position of mirror 500 with respect to axis of rotation 632 will affect where the reflected laser beam 614 is received by the detector 612. Thus, the position detector 612 will be able to sense data indicative of the actual position of mirror 500. This sensed data can then be fed back via 618 for improved X-axis mirror control.

Figure 6C:
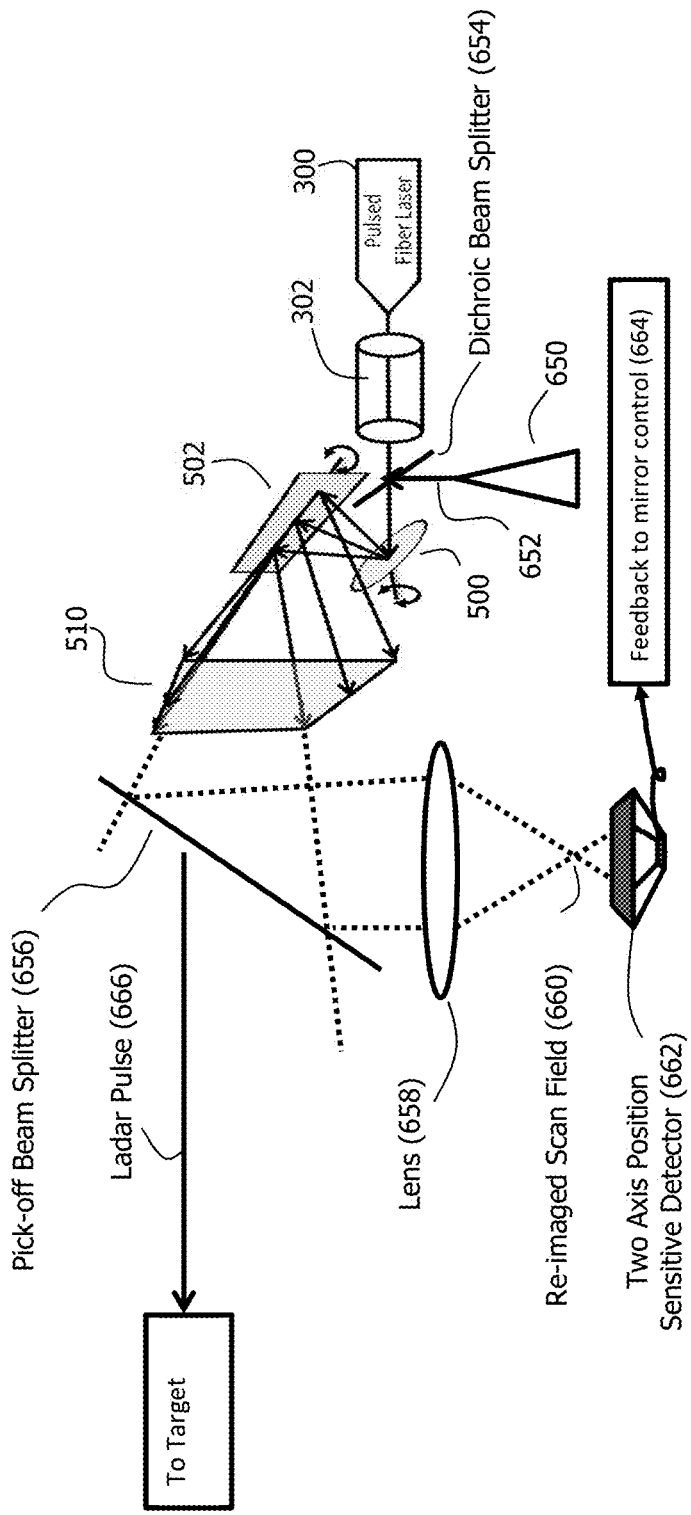

FIG. 6C depicts another example embodiment for closed loop feedback control of mirror positioning. While the examples of FIGS. 6A and 6B, if used together, employ two lasers 600 and 610 and two position detectors 602 and 612 to detect mirror positions, the example of FIG. 6C employs a single laser 650 and a single two-axis position sensitive detector 662.

With the example of FIG. 6C, a beam splitter 654 such as a dichroic beam splitter or pick-off mirror is positioned to intercept the laser pulse emanating from the laser optics 302 before it strikes mirror 500. An alignment laser 650 is also positioned to direct an alignment laser beam 652 onto the beam splitter 654. The dichroic beam splitter (acting as a beam combiner) co-aligns the laser beam from laser source 300 with the alignment laser beam 652. As such, the aligned laser beams will be incident on mirror 500 such that the laser lies completely within the mirrors plane of rotation i.e. perpendicular to the mirror's axis of rotation. The dichroic beam splitter 654 can be positioned to achieve such co-alignment, and a 90 degree combination angle as between the laser 300 and alignment laser 650 is typical. Laser 650 can be a visible CW or high repetition rate pulsed diode laser.

Also, a beam splitter 656 such as a pick-off beam splitter can be positioned to intercept the reflected laser light from mirror 502, which will include both the targeting ladar pulse 666 generated by laser source 300 and the alignment laser beam 652 generated by laser 650. The beam splitter 656 will direct the ladar pulse 666 toward the targeted range point while also reflecting a small portion of the light onto re-imaging lens 658. The re-imaging lens 658 will ultimately re-image the scan field 510 onto a two-axis position sensitive detector 662. The position detector 662 will be able to detect the position of the reflected alignment laser beam 652 along two-axes, and this detected position can serve as data indicative of the actual positions for both mirrors 500 and 502. This sensed data can then be fed back via 664 for improved X-axis and Y-axis mirror control.

Figure 7A:
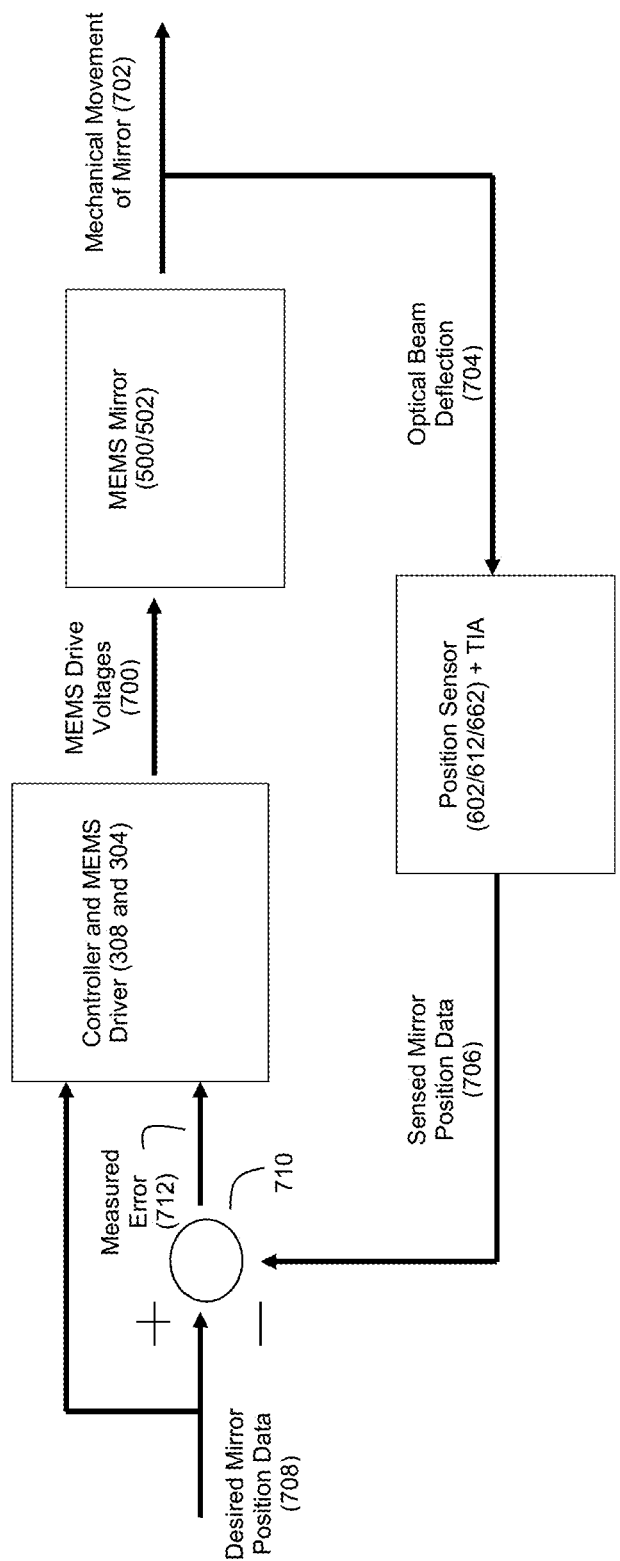
FIG. 7A depicts an example embodiment for error correction in a closed loop feedback system.

FIG. 7A depicts an example arrangement whereby the closed loop feedback system 310 can process the sensed position data from the position detectors to generate an error signal that can be used to drive an adjustment correction to the driving waveforms for the mirror scan positions. In this example, the closed loop feedback system 310 is used to finely tune the positioning of a MEMS mirror 500/502) in the scanner 304. The beam scanner controller 308 and a MEMS driver within scanner 304 will apply MEMS drive voltages 700 to the MEMS mirror 500/502. This results in mechanical movement 702 of the mirror to a desired mirror position. However, as noted, it is expected that there may be some error in this positioning that is to be mitigated via the closed loop feedback system. As explained in connection with the example embodiments of FIGS. 6A-C, an optical beam deflection 704 can be sensed by any of the position sensors 602/612/662 described in connection with the example embodiments of FIGS. 6A-C. The position sensor may be accompanied by a trans-impedance amplifier (TIA) that serves to amplify the signal sensed by the position sensor for signal processing purposes. The position sensor can produce sensed mirror position data 706 that is indicative of the actual position of the MEMS mirror. Thus, if the Y-axis mirror was expected to target Row 3 of the scan area, but the actual sensed position for the Y-axis mirror was effective to target Row 4 of the scan area, the feedback system can detect an error of 1 row downward. This error measurement can be fed to the beam scanner controller 308 so that the beam scanner controller can adjust the driving waveform for the Y-axis mirror to achieve an upward adjustment of 1 row.

The sensed mirror position data 706 can be combined with the desired mirror position data 708 that is used as an input by comparator 710 to compute a measured error 712. The measured error 712 can be a value that is indicative of the difference between the actual and expected mirror positions.

The beam scanner controller 308 may then use any of a number of techniques to process the desired mirror position data 708 in view of the measured error 712 to adjust the MEMS drive voltages 700 in view of this measured error 712. For example, proportional-integral-derivative (PID) control techniques may be used to perform this feedback control. As another example, device inverse response waveforms can be used, in which case a stored response waveform is used to counter the natural device step response and reduce settling time.

Figure 7B:
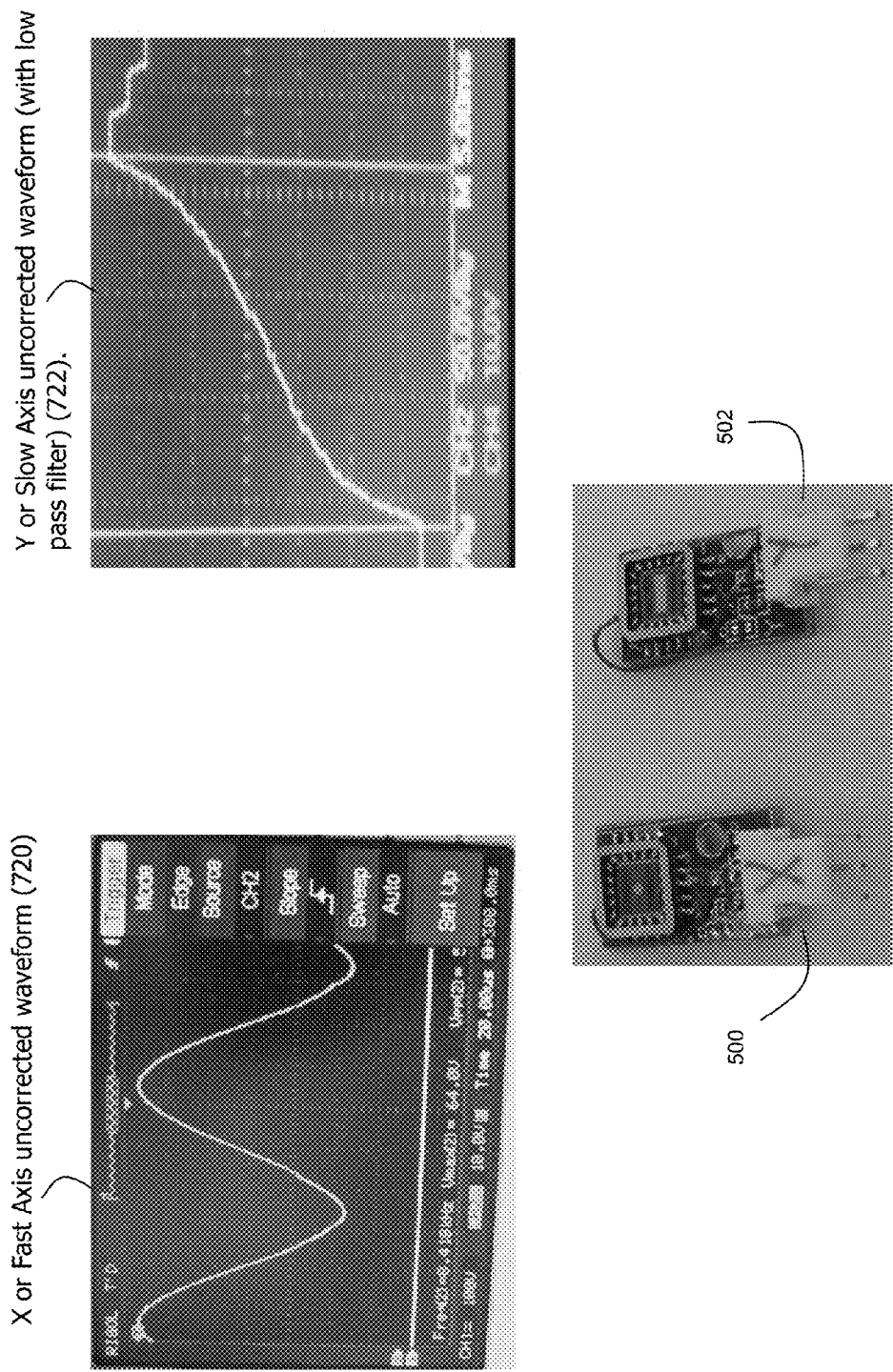
FIGS. 7B and 7C depict example voltage waveforms that relate to controlling the mirror scan positions.

FIG. 7B depicts example driving waveforms 720 and 722 that might be used to drive the mirror positions for the X-axis mirror 500 and the Y-axis mirror 502 respectively. In this example, the fast axis X-axis mirror 500 is driven in a resonant mode while the slow axis Y-axis mirror 502 is driven in a point-to-point mode where the driving waveform 702 varies as a function of the shot list. These examples show the driving waveforms in an uncorrected form where no feedback is used to fine tune mirror positioning.

Figure 7C:
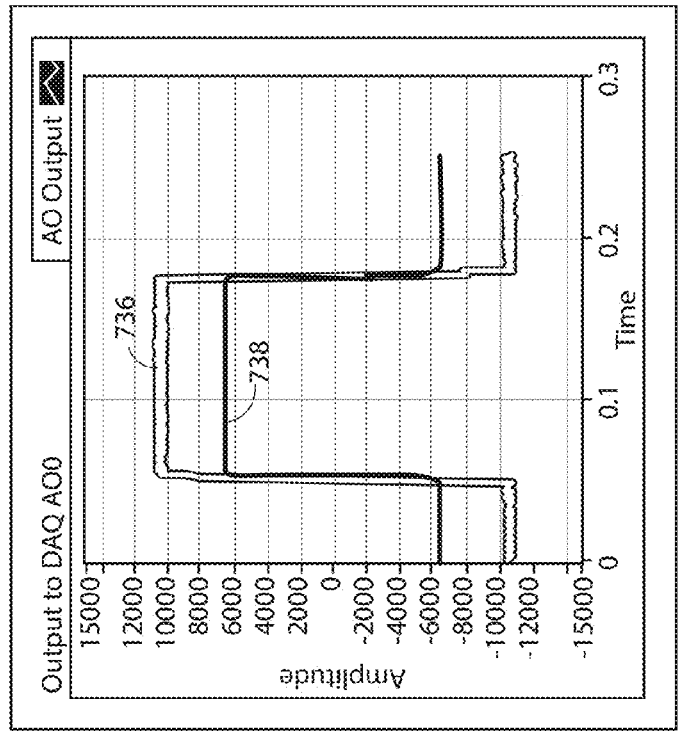
Figure 7C:
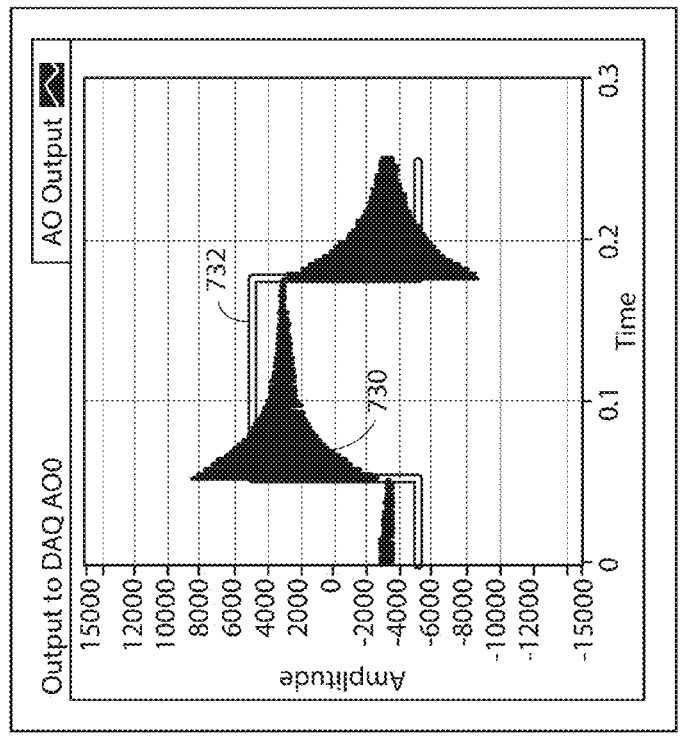

FIG. 7C depicts examples of how mirror positioning error can be corrected by an exemplary closed loop feedback system 310.

The left frame of FIG. 7C shows an example Y-axis open loop driving waveform without low pass filtering. As shown by the difference between the uncorrected actual position waveform 730 that corresponds to the actual mirror position and the waveform 732 for the commanded mirror position, there is a fairly significant error that would correspond to the measured error 712 if closed loop feedback were not used to sense the actual mirror position. That is, while the driving waveform 732 seeks to drive the mirror to a desired position via a square wave, in actuality, as the mirror moves toward the desired position, the mirror will overshoot and undershoot the desired position in a fluctuating manner as shown by 732, which corresponds to the settling time for mirror positioning. This settling time repeats itself as the square wave 732 transitions to a low state following the high state.

The right frame of FIG. 7C shows an example Y-axis closed loop driving waveform. In this example, closed loop feedback is employed as described in connection with FIG. 7A to reduce the settling time error. As shown by the similar shapes of the waveform 736 for the commanded position and the waveform 738 for the actual position, the closed loop feedback is effective to effectively eliminate the large settling time error that is shown in the left frame of FIG. 7C. It should be understood that the general amplitude values shown in FIG. 7C are inconsequential, and the important characteristic is the comparative shape and timing of each waveform.

Thus, based on the closed loop adjustments to the driving waveforms, it is believed that finer control over mirror scan positions can be achieved that will, over time, reduce the detected error signal.

While the examples of FIGS. 6A-C describe the use of closed loop optical feedback control, it should be understood that other modes of closed loop feedback control of the mirror scan positions can be employed. For example, closed loop capacitive feedback control may be employed. With capacitive feedback, a capacitor would be formed by the edge of the mirror (serving as a first capacitor plate) and a reference metal plate (serving as a second capacitor plate), with the air/vacuum gap between the mirror edge and reference plate serving as the capacitive dielectric. As the mirror's scan position changes, the gap distance will change, thus causing a change in the capacitor's capacitance. The closed loop capacitive feedback system would thus track a capacitance change (via a voltage measurement) as the mirror changes scan positions to determine the actual mirror position. Based on the determined actual mirror position, the error relative to the desired position can be computed. As additional examples, different forms of optical feedback or capacitive feedback can be used for closed loop feedback control of mirror positioning.

Dynamic Scan Patterns:

To further improve performance of the scanning ladar transmission system 104, it is preferred that dynamic scan patterns be employed. With a fixed scan pattern, the beam scanner 304 will scan through the full scan area 510 and the laser source 300 is fired when the scanning mirrors are positioned to target a desired range point. Thus, with a fixed scan pattern, it is expected that the driving waveforms used to define mirror scan positions will not vary as a function of the range points on the shot list 112.

By contrast, with a dynamic scan pattern, the beam scanner will not scan through the full scan area 510, and instead the mirrors will target the range points on the shot list 112 in accordance with a scan pattern that varies as a function of the ordered range points on the shot list 112. Because the shot list 112 will be varying from frame to frame captured by the environmental sensing system 106, the scan pattern is dynamic as it will also vary from frame to frame.

Figure 8A:
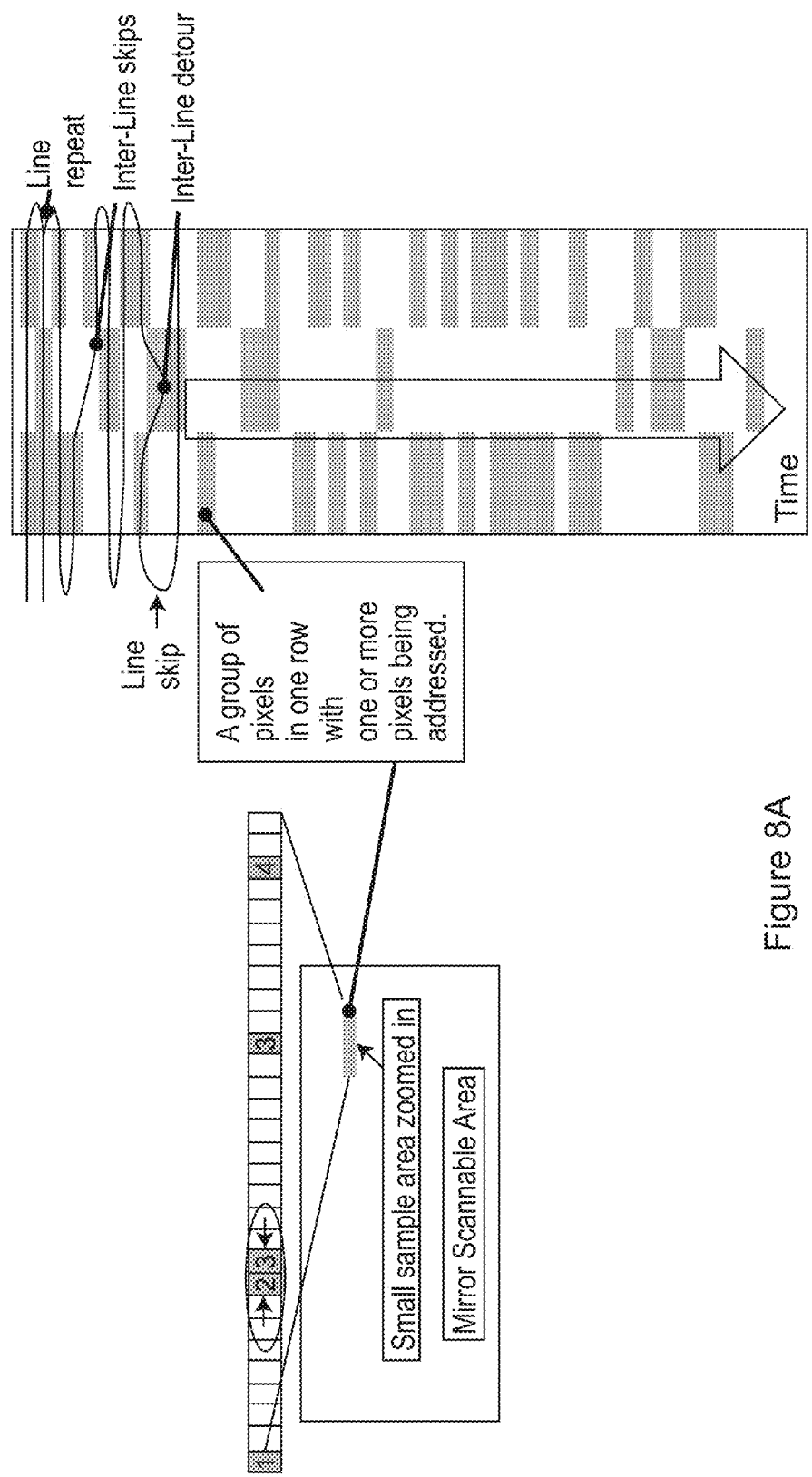
FIGS. 8A-F depicts examples of dynamic scan patterns that can be used by the scanning ladar transmission system.

FIGS. 8A-F depict examples of different dynamic scan patterns that could be employed by the system FIG. 8A describes an example base addressing scheme for a dynamic scan pattern. As a general matter, the mirrors will be scanned to produce a scan pattern that generally proceeds from left to right across a top row, then downward to the next row where the scan direction is from right to left, and so on, where the scan direction alternates each row downward. However, it should be understood that alternative base patterns could be employed, such as starting from a bottom row and working upward, and/or changing the alternating scan directions to start from right to left. Also, as shown by FIG. 8A, a dynamic scan pattern may include line repeats, line skips, and inter-line skips, and inter-line detours, as explained below.

With a line repeat, the beam scanner maintains the Y-axis position for the transmitter during successive left-to-right and right-to-left scans along the X-axis. A line repeat may be needed when the two pixels on the shot list are in the same row but are too close together to be targeted during a single pass. In such a case, the line can be repeated, and the additional pixel on the shot list can be targeted during the return scan pass. A minimum pixel spacing constraint for the dynamic scan pattern can govern the need for line repeats. The minimum pixel spacing corresponds to the fastest rate the laser source 300 can fire back-to-back shots. It should also be understood that the minimum pixel spacing parameter can vary by position within the scan area 510 in embodiments where resonant beam steering is employed.

A sample line repeat scenario is shown by FIG. 8A with respect to sample row area that includes a group of 4 pixels that share the same row. In this example, the minimum pixel spacing is 5 pixels. The laser source 300 fires at pixel (1) first. Since the next pixel (2) is more than five pixels away, the laser can fire at it on the same pass. However pixel (5) is too close in time to be addressed, so the system will address it on the next pass after it performs a line repeat. Thus, during the left-to-right scan, the laser source 300 passes over pixel (5) and fires at pixel (3). The scanner and laser then finish scanning the row by firing at pixel (4) and repeat the same row, this time scanning from right to left. On this following pass, pixel (5) is addressed and the scanner is allowed to move on to the next row. With a line repeat, the scanner can be configured to repeat the row until all required pixels have been interrogated.

With a line skip, the beam scanner adjusts the Y-axis position for the transmitter by more than one row after completing a scan pass of a given row. A line skip may be employed when there are no pixels in the shot list for a row or a set of successive rows. An example line skip is shown in the scan timing diagram of FIG. 8A.

With an interline skip, the beam scanner adjusts the Y-axis position for the transmitter before completing a full scan across a given row. An interline skip may be employed when there is a large contiguous portion of a row that is empty. In such a case, the system may choose to address the next row or rows if that will result in a faster scan of the scan area with respect to the shot list. Examples of interline skips are shown in the scan timing diagram of FIG. 8A.

An interline detour is a type of interline skip. With an interline detour, the beam scanner adjusts the Y-axis position from the given row to a new row for the transmitter before completing a full scan across the given row, but returns to the given row before completing the scan across the new row. As explained below, an interline detour can serve as an opportunistic and valuable detour from the current row in the normal raster trajectory to address a pixel in a row or a pixel that would have to normally be skipped because it is too close to another pixel in the same row. An example of an interline detour is shown in the scan timing diagram of FIG. 8A.

Figure 8B:
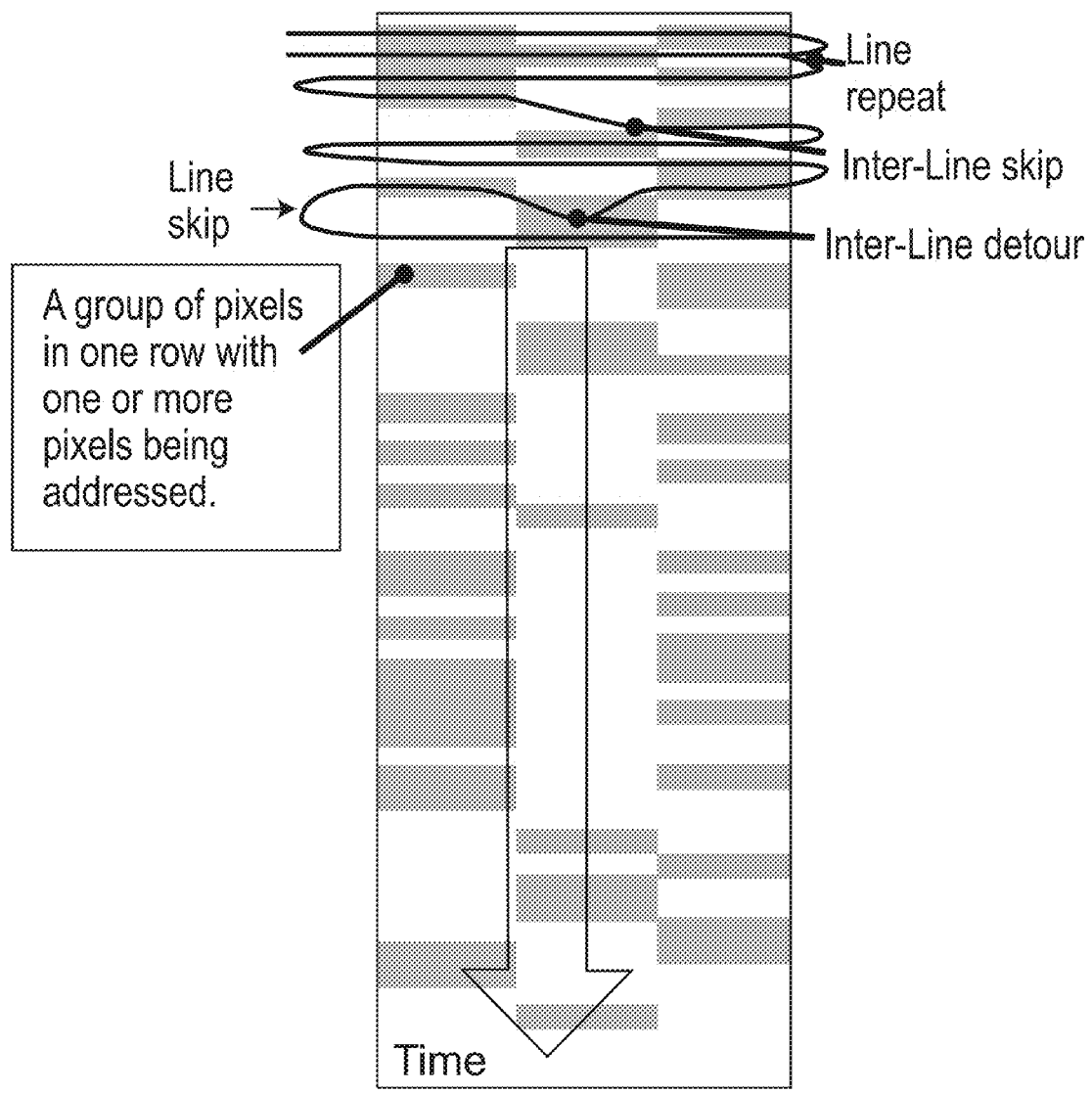

FIG. 8B depicts an example dynamic scan pattern that employs line repeats, line skips, interline skips, and interline detours as discussed in connection with FIG. 8A. The dynamic scan pattern of FIG. 8B can be employed with a beam scanner that includes dual scanning mirrors where the X-axis mirror scans in two directions as a fast axis mirror at a resonant frequency and where the Y-axis mirror scans in two directions as a slow axis mirror in a non-resonant, point-to-point mode. Closed loop feedback control, such as the closed loop optical feedback control described in connection with FIGS. 6A-C, can be employed to provide phase drift correction of the Y-axis mirror and fast settling time for the X-axis mirror. Thus, in an example embodiment, optical feedback control can mitigate Y-axis settling time and X-axis phase shift issues. As noted, with two-direction Y-axis movement and interline detours, the Y-axis is capable of going back on itself during a single horizontal scan pass as shown by the interline detour example of FIG. 8B. The interline skipping/detouring can increase scanner efficiency and reduce the frame time (i.e., increase the frame rate).

Figure 8C:
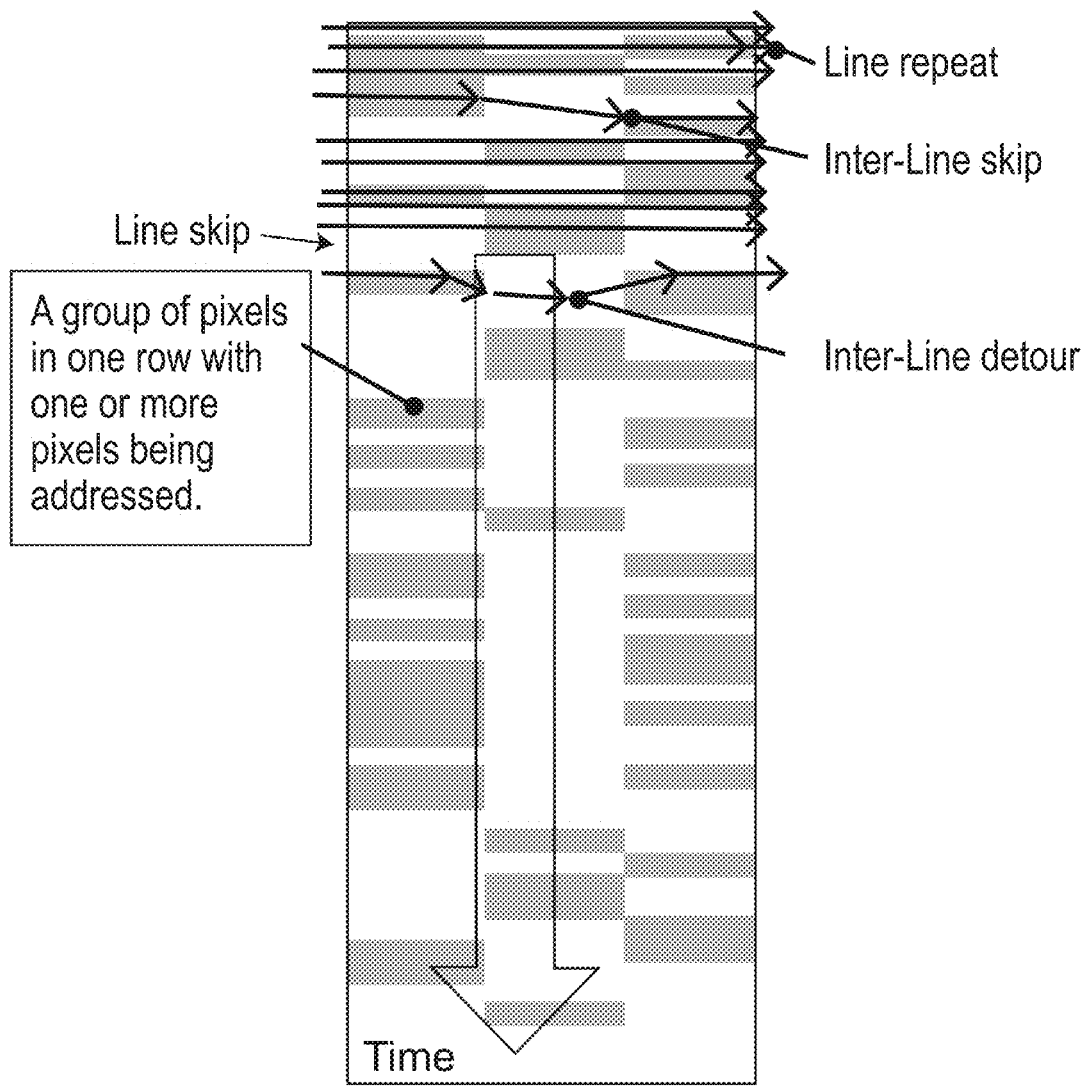

FIG. 8C depicts an example dynamic scan pattern that also employs line repeats, line skips, interline skips, and interline detours, but where the dynamic scan pattern of FIG. 8C can be employed with a beam scanner that includes a scanning Y-axis mirror (such as a Y-axis MEMS mirror) and an X-axis spinning polygon mirror. The X-axis spinning polygon mirror scans in one direction as a fast axis mirror in a non-resonant mode, and the Y-axis MEMS mirror scans in two directions as a slow axis mirror in a non-resonant, point-to-point mode. Closed loop feedback control, such as the closed loop optical feedback control described in connection with FIGS. 6A-C, can be employed to provide phase drift correction of the X-axis mirror and fast settling time for the Y-axis mirror. Optionally, a closed loop position encoder can be used in place of optical feedback to finely control the positioning of the spinning polygon mirror. The primary functional difference between the dynamic scan patterns of FIGS. 8B and 8C is that the dynamic scan pattern of FIG. 8C can only scan in one direction and does not scan in a resonant fashion.

Figure 8D:
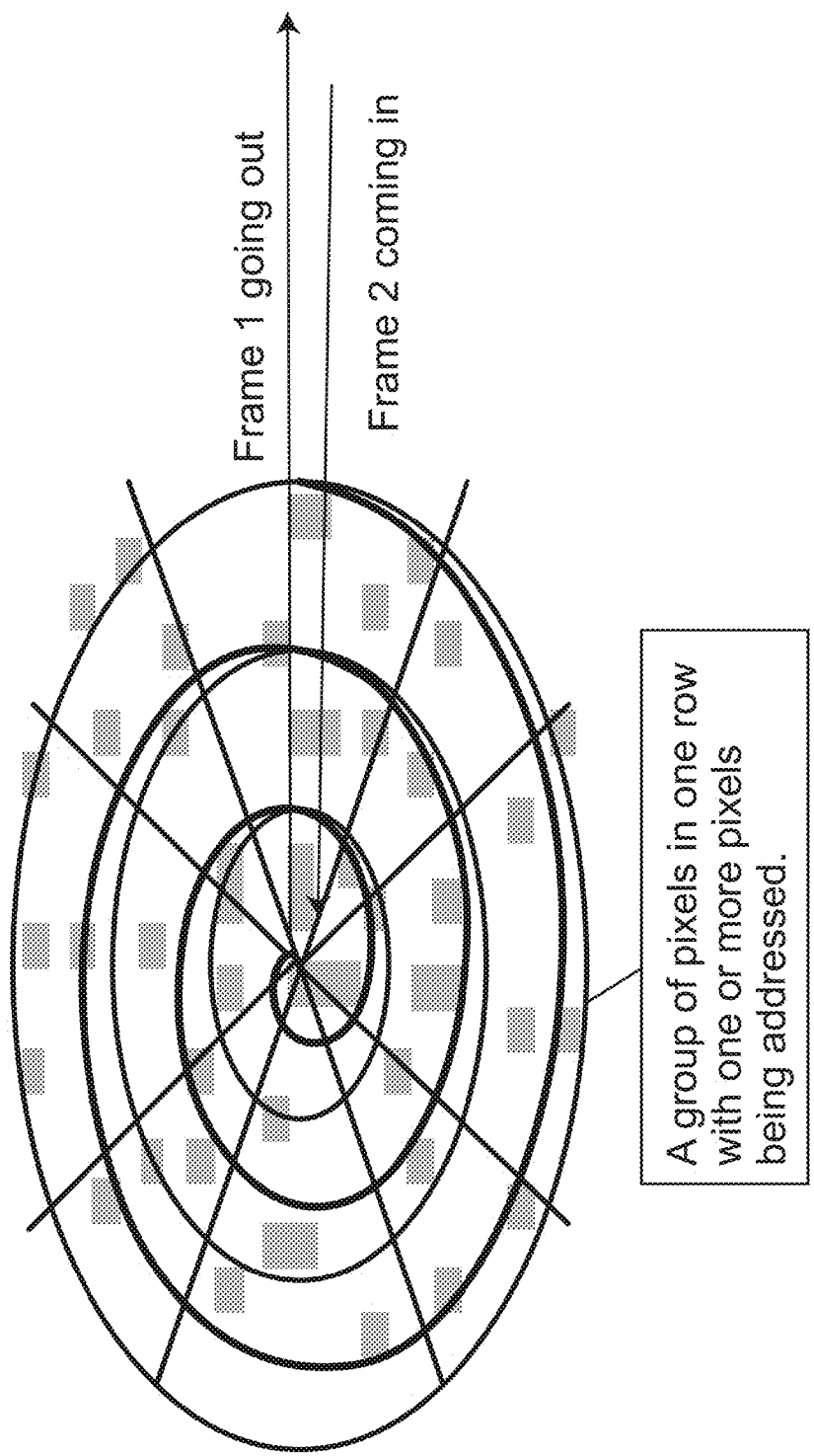

FIG. 8D depicts an example dynamic scan pattern that scans in a spiral pattern such as an elliptical/oval spiral. The dynamic scan pattern of FIG. 8D can support ellipse repeats, ellipse skips, interellipse skips, and interellipse detours, which are elliptical analogs to the line repeat, line skips, interline skips, and interline detours respectively discussed in connection with FIGS. 8A-C. The beam scanner can employ dual scanning mirrors such as an X-axis MEMS mirror and a Y-axis MEMS mirror. Both the X-axis and Y-axis mirrors can scan in two directions in a resonant mode. It is expected that a scanner that employs the scan pattern shown by FIG. 8D will include relay imaging optics between the two mirrors. Both mirrors can scan near a resonant frequency, which may be the first resonant frequency. FIG. 8D shows an example elliptical/oval spiral pattern where two single axis mirrors are operating near or at one of their resonant frequencies (same frequency and phase for both). The amplitude of the spiral is controlled by the amplitude of the driving voltages on the mirrors. The same concept applies as in the dynamic scan pattern of FIG. 8B, but the concentric ellipses are the "rows" or the "fast axis" and the pixels lie in the rings. The "columns" or "slow axis" is addressed by the amplitude of both mirrors. The spiral pattern arises from the transition between concentric oval rings. A ring can be repeated or skipped just like in the "raster-like" dynamic scan pattern of FIG. 8B, either after a full revolution (an ellipse skip) or between full revolutions (an interellipse skip or interellipse detour). Closed loop feedback control, such as the closed loop optical feedback control described in connection with FIGS. 6A-C, can be employed to finely control the mirror scan positions.

The dynamic scan patterns of FIGS. 8A-C can be characterized as base scan patterns. These base scan patterns can be embedded into higher level macro dynamic scan patterns such as those depicted in connection with FIGS. 8E and 8F.

Figure 8E:
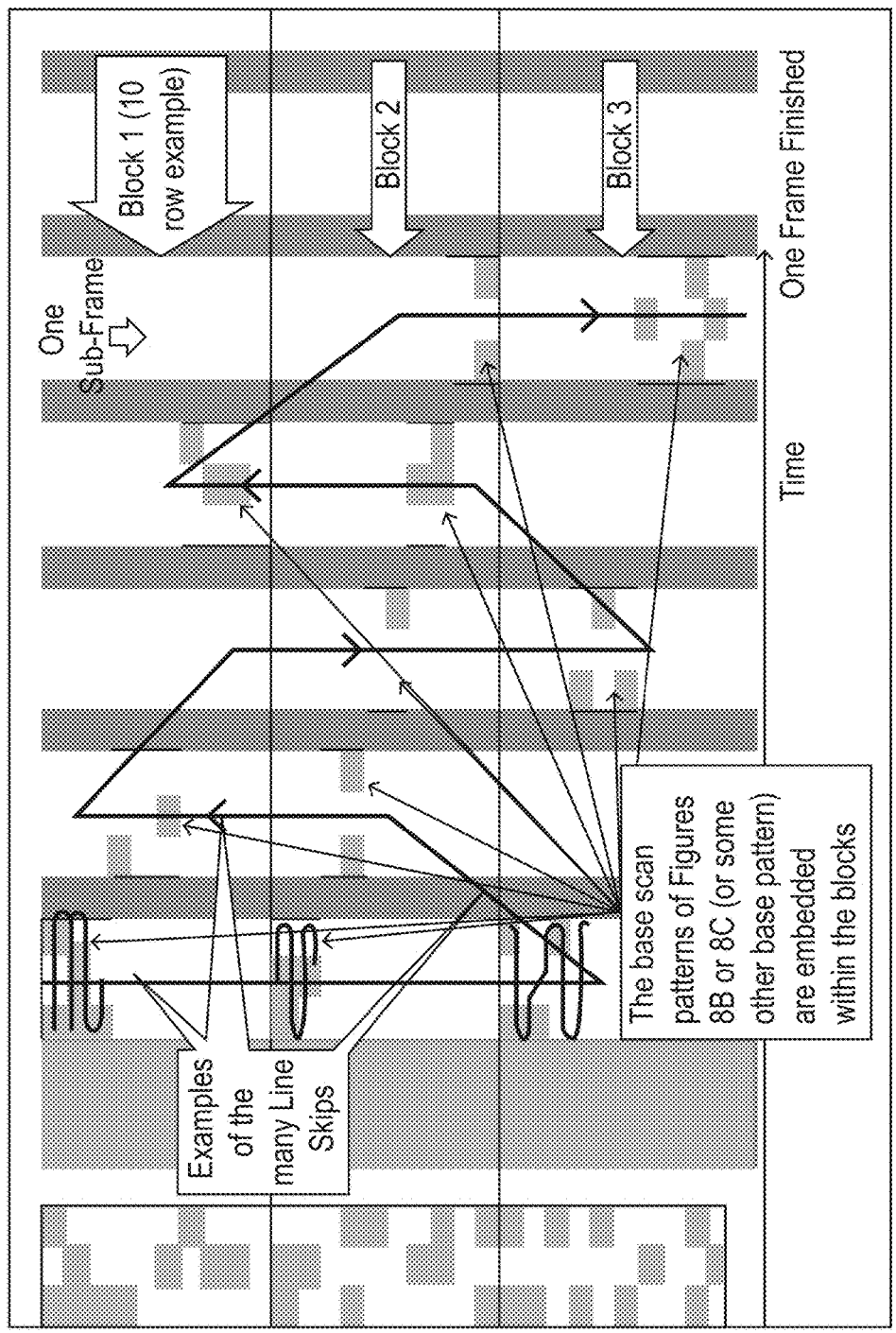

FIG. 8E depicts an exemplary macro dynamic scan pattern where the scan area is divided into a plurality of blocks, and where a base dynamic scan pattern is executed within a portion of each block as the scanner proceeds from block to block. As examples, the dynamic scan patterns of FIGS. 8B and 8C (or other dynamic scan pattern) can be embedded within each block portion.

A reset jitter may arise when a large block of pixels are addressed for relatively contiguous scanning, and this reset jitter may lead to a degraded signal-to-noise ratio (SNR). To reduce this possible SNR degradation, the dynamic scan pattern can break the scan area defined by the shot list into smaller blocks. The size of these smaller blocks can be influenced by a maximum amount of background light desired for a ladar receiver. Thus, for a ladar receiver that employs a block structure, the block sizes can correspond to these blocks. Each block can be re-visited by the scanner several times as shown by FIG. 8E. One frame is broken up into several interlaced subframes as shown. Each subframe corresponds to a change in direction of the Y-axis/slow axis in the macro pattern. The example of FIG. 8E shows a three block frame with five subframes, and where there are several rows in each block.

This macro pattern essentially divides blocks by the total number of pixels that can be grouped together in one pass. As noted, that number can depend on parameters such as the SNR.

FIG. 8E shows an example of a dynamic macro scan pattern. In the example of FIG. 8E, the 1st and last blocks will address a few more pixels each sub-frame than the other blocks so that timing is orderly, which causes the SNR in those pixels to be a little less. However, since this is away from the center pixels of the frame this degradation in SNR may be acceptable in many applications.

Figure 8F:
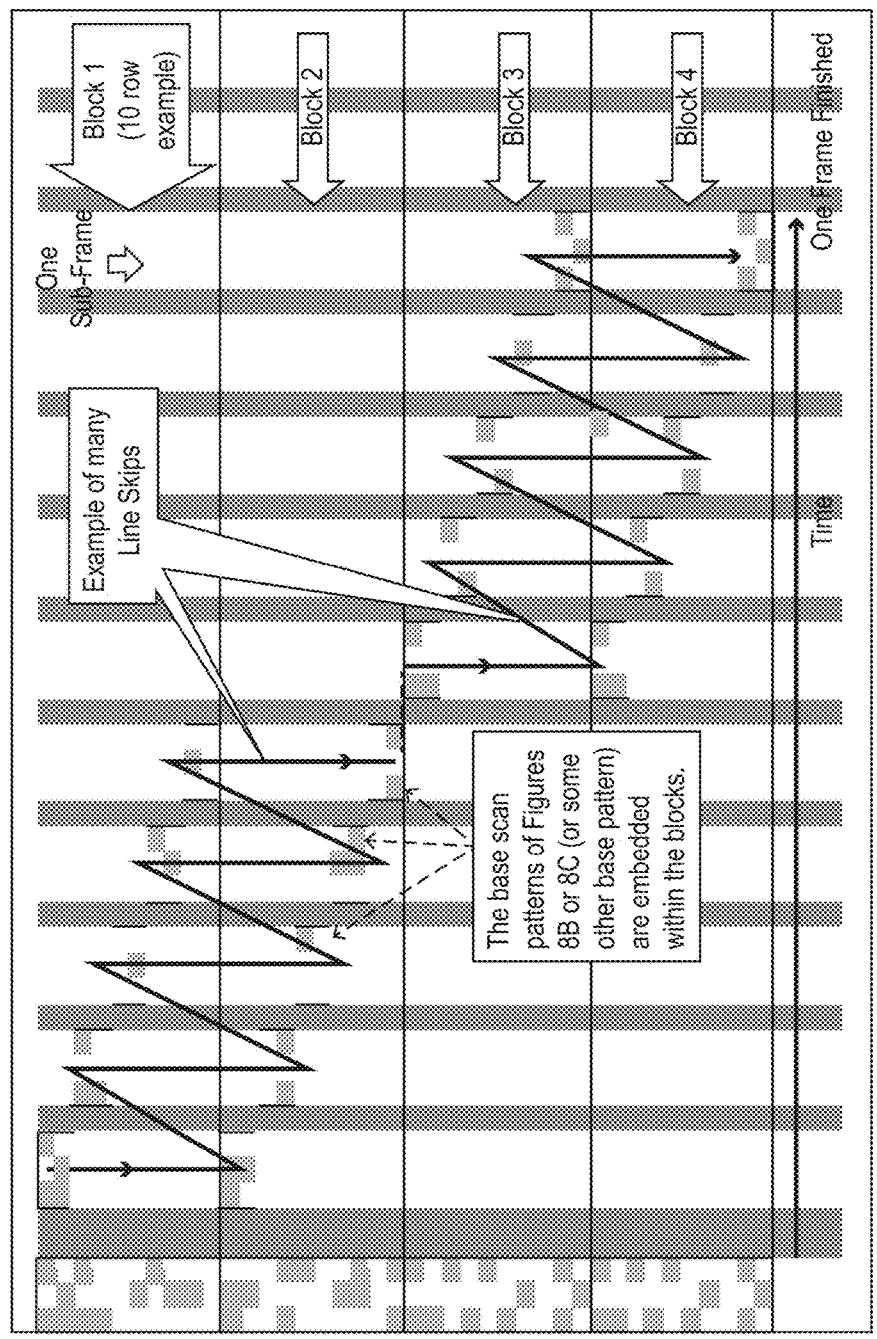

FIG. 8F depicts an exemplary macro dynamic scan pattern similar to the macro scan pattern of FIG. 8E, but where the macro scan switches between the block portions of two blocks before proceeding on to the next two blocks. In other words, the scanner ping-pongs between a pair of blocks until all range points within that pair of blocks are addressed, whereupon the scanner moves on to another pair of blocks and repeats. As with FIG. 8E, the dynamic scan patterns of FIGS. 8B and 8C (or other dynamic scan pattern) can be embedded within each block portion of the FIG. 8F macro scan pattern.

Figure 9B:
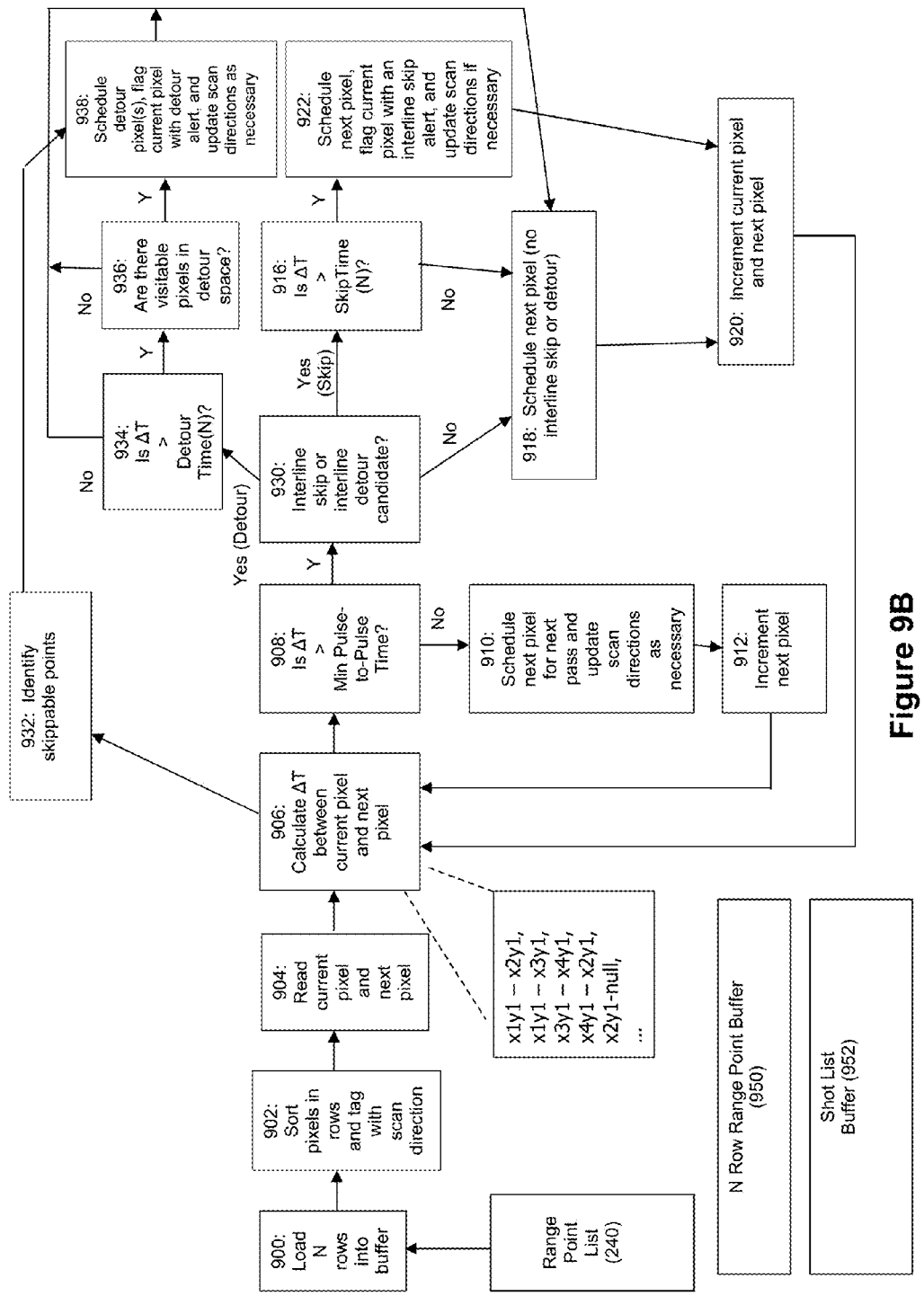
FIG. 9B depicts another example embodiment for converting a list of range points into a shot list for ladar targeting.

Translation of a Range Point List into a Shot List:

Any of a number of processing rules can be used to translate a range point list 240 into a shot list. As noted above, the translation of a range point list 240 into a shot list (see step 204 in FIG. 2A) can be performed by processor 120 or by a beam scanner controller 308. The rules can be executed in software, implemented in hardware (e.g., on a field programmable gate array (FPGA) or application-specific integrated circuit (ASIC), or some combination of the two. As such, the processor used to perform the translation from the range point list to the shot list can be any processor suitable for use within processor 120 or beam scanner controller 308, including but not limited to a microprocessor, FPGA, ASIC, or the like. FIG. 9A depicts an example process flow for such translation where the shot list accommodates interline skipping (but not including interline detours). FIG. 9B depicts an example process flow for translating a range point list into a shot list where the shot list accommodates interline skipping, including interline detours.

As shown by FIG. 9A, a range point list 240 serves as input to the process flow. At step 900, the first N rows of the range point list are loaded into a buffer 950. In this example, it is presumed that the range point list already has the range points in at least row order (e.g., starting from the top row and progressing downward). However, if this is not the case, the process flow can also sort the range points into a row order so that the first N rows can be loaded into buffer 950. In this example embodiment, the value for N is 2, in which case the buffer may hold the range points for Row Y1 and Row Y2, with each row comprising one or more range points. It should be understood that the use of a 2-row input buffer is an example only, and a practitioner may choose to employ a large buffer that supports the consideration of N rows of range points (where N>2). While such an increase in the number of rows and pixels under evaluation at a given time will require additional processing steps and additional buffer space, the practitioner can rely on guidance from the 2-row example provided by FIGS. 9A and 9B when implementing such a process flow. Also, it should be understood that as the process flow operates to read pixels out of the N row buffer for scheduling into the shot list, step 900 will operate to keep updating buffer 950 with the next row as each row is completed.

At step 902, the processor sorts the pixels into the buffer rows and tags each pixel with a scan direction. The default scan pattern for the shot list can be a scan pattern that is a left-to-right scan for each row. Another option is a default scan pattern that is a left-to-right scan direction for the first row, changes to a right-to-left scan direction for the second row, and then continues alternating scan directions for subsequent rows. In the example embodiment of FIG. 9A, the default scan pattern can be a left-to-right scan direction for each row.

With step 902, the pixels in each row are sorted so that they are ordered in accordance with the default scan pattern. Thus, for a row having a left-to-right scan pattern, the pixels are sorted such that the leftmost pixel is first, the second leftmost pixel is next, and so on until the rightmost pixel which will be last. For a row having a right-to-left scan pattern, the pixels will be sorted in the opposite manner. Each pixel may also be tagged with control metadata that identifies the scan direction for that pixel (e.g., a flag indicative of whether a left-to-right scan or a right-to-left scan will hit the pixel). It should also be understood that the range point list 240 may arrive at the process flow of FIG. 9A having already been pre-sorted in this fashion, in which case step 902 would not be needed.

At step 904, the first two pixels from the buffer 950 are read to identify a current pixel for evaluation and a next pixel candidate. This pair of pixels can be evaluated to determine how they should be ordered in the shot list.

At step 906, the process flow computes a $\Delta T$ between the current pixel and the next pixel candidate. This $\Delta T$ value is representative of the amount of time required for the scanner to scan from the current pixel to the next pixel candidate. $\Delta T$ can be computed as a function of the x-coordinates of the current pixel and next pixel candidate as well as the sinusoidal trajectory and frequency of the fast axis. Also, the processor can perform step 906 for only the current pixel and the next pixel candidate, or it can perform step 906 in a batch mode wherein the processor computes $\Delta T$ for a number of pixel pairs before proceeding to step 908. For example, in a batch mode, the processor can compute $\Delta T$ values for each pair of neighboring pixels in the 2-row buffer 950. As another batch mode example, the processor can compute $\Delta T$ values for each possible permutation of pixel pairs for the pixels in the 2-row buffer 950.

Next, at step 908, the processor compares the computed ΔT for the current pixel and next pixel candidate with a parameter that corresponds to a minimum amount of time that is needed between successive ladar pulses ("Min Pulse-to-Pulse Time"). For an example embodiment, the Min Pulse-to-Pulse Time is a constant whose value is set as a function of the maximum range or the minimum energy required from the laser source 300. For example, for an embodiment where a fiber laser is used, the fiber laser will have a minimum amount of energy required from it, and Min Pulse-to-Pulse Time is set so that laser recharge time is long enough to allow this minimum amount of energy to be build up. Furthermore, it should be understood that the pulse rate for the laser source affects characteristics such as range and SNR. For example, by decreasing the pulse rate, the range for the system would be increased. As such, while the Min Pulse-to-Pulse Time is a constant in an example embodiment, it should be understood that this constant can be adjustable as a system level setting. Furthermore, it should be understood that the Min Pulse-to-Pulse Time need not be the same everywhere in the field of view/scan area.

If step 908 results in a determination that the computed ΔT is less than the Min Pulse-to-Pulse Time, this means that the next pixel candidate is too close to the current pixel, in which case the next pixel candidate is scheduled for the next pass of the scanner. Thus, at step 910, the next pixel candidate is scheduled into the shot list buffer 952 for a return scan of that row in a format where the last skipped is the first hit (i.e. a LIFO or last in first out). This means a line repeat will be needed to lase the next pixel candidate, and the next pixel candidate will be placed into the shot list after any other pixels of the current row that will not need to be lased on the return scan. To flag the line repeat, the next pixel candidate can be re-tagged with the opposite scan direction. In a situation where the default scan pattern for the sorted rows is an alternating scan direction, it should also be understood that the line repeat may also mean that the pixels in the next row will be hit from the opposite scan direction relative to the default scan pattern, in which case step 910 also re-tags the pixels in the next row with the opposite scan direction relative to their previous scan direction and re-sorts those re-tagged pixels in accordance with their new scan direction.

Then, at step 912, the processor increments the next pixel candidate such that the new next pixel candidate will be the pixel in the range point list buffer 950 that is immediately after the current next pixel candidate (while the current pixel remains the current pixel so that the current pixel can next be evaluated relative to the new next pixel candidate, unless the new next pixel candidate is on the next row, in which case the processor will use the first pixel in the next row as the new current pixel and the pixel after the first pixel of the next row as the new next pixel candidate). It should be noted that in the situation where the next pixel is on the next row, the pixels on the next row may need to be re-sorted and re-tagged with the opposite scan direction. The processor then returns to step 906 and the process flow repeats. FIG. 9E shows an example of a shot list where an interline skip is present as a result of a process flow such as the one shown by FIG. 9A.

If step 908 results in a determination that the computed ΔT is not less than the Min Pulse-to-Pulse Time, this means that there is a sufficient amount of time for the scanner to lase the current pixel, scan to the next pixel, and lase the next pixel. As such, the next pixel candidate can be scheduled as the next pixel after the current pixel in the shot list. However, the processor will also test the next pixel to assess whether it is a candidate for an interline skip (step 914).

To test the next pixel candidate at step 914 for a possible interline skip, the processor looks for two conditions to be met: (1) the current pixel and next pixel candidate are on different rows, and (2) a line repeat is not needed to hit the pixels on the current row in a return scan. If these conditions are not met, then the next pixel candidate is not an interline skip candidate, and the next pixel candidate is scheduled as the next pixel in the shot list buffer 952 at step 918 (in which case no interline skip is used). If these two conditions are met, then at step 916, the processor determines whether there is sufficient time for the scanner to lase the current pixel, scan to the next pixel candidate on the new row, and lase that next pixel candidate. To make this determination, the computed ΔT is compared with a SkipTime(N) parameter. The SkipTime(N) parameter defines a minimum amount of time that is needed for the scanner to jump from the current row to the next row. The value of N can correspond to the number of rows under consideration in the buffer.

If ΔT is less than SkipTime(N), this means there is an insufficient amount of time for the scanner to jump to the next row and hit the next pixel candidate. In this situation, the process flow proceeds to step 918 and the next pixel candidate is scheduled as the next pixel without an interline skip. This means that the scanner will continue its scan of the current row to the end of the row, jump to the next row and scan in the opposite direction to the next pixel candidate. As such, the next pixel may need to be re-tagged to change its scan direction in view of the scan direction that will be used by the scanner to reach that pixel.

If ΔT is greater than SkipTime(N), this means there is a sufficient amount of time for the scanner to jump to the next row and hit the next pixel. In this situation, the process flow proceeds to step 922. At step 922, (1) the next pixel candidate is scheduled as the next pixel in the shot list buffer 952, and (2) the current pixel is tagged with an interline skip alert to inform the scanner that the next pixel requires an interline skip.

Step 920 can be reached from either step 918 or step 922. At step 920, the processor increments the current pixel and the next pixel candidate. The current next pixel candidate will become the new current pixel, and the new next pixel candidate will be drawn from buffer 950. If the next pixel in buffer 950 is on the next row, then the processor may need to re-sort the pixels of the next row (and change their scan directions) before reading the new next pixel candidate to accommodate the scan direction that will be used to target those pixels. For example, assume the new current pixel will be x5y1 (sitting on row 1 and having a left-to-right scan direction) and the next pixel in buffer 950 is pixel x2y2 (sitting on row 2 and having a left-to-right scan direction), but pixel x2y2 shares row 2 with pixels x6y2 and x9y2 (where x6y2 and x9y2 are the remaining pixels for row 2 in buffer 950). To accommodate a desired right-to-left scan direction for row 2, the processor can re-sort the pixels in row 2 so that their order in the buffer 950 is x9y2, x6y2, and x2y2 (rather than x2y2, x6y2, and x9y2) while also changing their tagged scan directions to right-to-left. Thus, x9y2 would serve as the new next pixel candidate rather than x2y2. The processor then returns to step 906 and the process flow repeats.

The process flow of FIG. 9A thus produces a shot list in the shot list buffer 952 that supports a dynamic scan pattern with interline skips.

As noted, FIG. 9B depicts an example process flow that supports interline skips that include interline detours. Steps 900-922 generally operate as described in connection with FIG. 9A, although step 914 will be replaced by a step 930 that not only tests for an interline skip scenario as described for step 914 in FIG. 9A but also tests for a possible interline detour scenario.

To accommodate interline detours, the process flow of FIG. 9B also considers a parameter that corresponds to a minimum time required for the scanner to go from its current row to another row that is N rows away, visit one or more pixels in the another row, and then go to back to the next pixel in the current row ("DetourTime(N)", where in the example of FIG. 9B, N=2). The DetourTime(N) parameter can be a constant whose value is mostly set as a function of the electro-mechanical properties of the Y-axis.

Thus, for the process flow of FIG. 9B, step 930 not only tests the current pixel-next pixel candidate pair to assess whether the next pixel candidate is an interline skip candidate (see step 914 of FIG. 9A), but step 930 will also test the current pixel-next pixel candidate pair to assess whether the next pixel candidate is an interline detour candidate. To evaluate for a possible interline detour, the processor checks whether the current pixel and next pixel candidate share the same row. If they share the same row, there is the possibility of an interline detour, and the processor proceeds to step 934.

At step 934, the processor determines whether there is sufficient time for an interline detour. It does so by comparing the computed ΔT for the current pixel and the next pixel candidate with the DetourTime(N) parameter.

If step 934 results in a determination that the computed ΔT is not greater than DetourTime(N), then the processor proceeds to step 918, which operates as described in connection with FIG. 9A, from which the process flow continues as described in connection with FIG. 9A.

If step 934 results in a determination that the computed ΔT is greater than DetourTime(N), this means that an interline detour might be scheduled and the processor proceeds to step 936. At step 936, the processor checks whether there are range points on the range point list that can be visited during the interline detour.

To support this determination, the processor at step 932 will identify which range points in the 2-row buffer are skippable due to the computed ΔT value for each pair of neighboring pixels in the 2-row buffer. That is, step 930 identifies the range points that are likely to be targeted on a return pass of the scanner rather than an initial pass due to those range points being too close to the previous range point. It would be desirable to target such skippable range points via the interline detour if possible so that a return pass of the scanner might be avoided in order to improve the scan time. It should be understood that when identifying skippable points at step 932, the processor can take into consideration the scan direction that will be used by the scanner to target the range points on the row of interest. If step 906 operates in a batch mode as discussed above, step 932 may involve simply identifying the second pixel of each pixel pair for a given scan direction whose ΔT value is less than the Min Pulse-to-Pulse Time value. If step 906 does not operate in a batch mode, then step 932 may also involve computing the ΔT values for additional pixel pairs in the 2-row input buffer so that the skippable points can be identified.

In an example embodiment, the processor performs step 932 after performing step 906 regardless of whether step 936 is ever reached so that the system is already ready to perform step 936 should the process flow branch to step 936. However, this need not be the case.

At step 936, the processor evaluates pixels in the 2-row buffer to determine whether there are any pixels in the buffer that can be scheduled as the next pixel in an interline detour (such pixels can be referred to as detour pixels). The pool of pixels that are deemed "visitable" for the interline detour can include those pixels in the next row whose x value falls (1) after the x value of the current pixel (giving consideration to the scan direction of the scanner) but still providing enough time for the scanner to reach such an x-coordinate given the time required for the scanner to jump to next row and (2) before the x value of the next pixel candidate (giving consideration to the scan direction of the scanner) but still providing enough time for the scanner to reach the x-coordinate of the next pixel candidate.

If step 936 results in a determination that there is only one such visitable pixel for the interline detour, then that visitable pixel is scheduled as the next pixel in the shot list buffer 952 at step 938.

If step 936 results in a determination that there are multiple visitable pixels for the interline detour, and the spacing between these multiple visitable pixels does not violate the ΔT constraint, then those visitable pixels in sequence are scheduled as the next pixels in the shot list buffer 952 at step 938.

If step 936 results in a determination that there are multiple visitable pixels for the interline detour, but not all can be scheduled for the interline detour because of ΔT constraints, then priority is given to a visitable pixel that was identified as a skippable pixel at step 932. The visitable skippable pixel would be scheduled at step 938, and step 938 would also schedule any remaining visitable pixels if compliant with the ΔT constraints in view of the scheduling of the visitable skippable pixel.

If step 936 results in a determination that there are multiple visitable pixels for the interline detour, but not all can be scheduled for the interline detour because of ΔT constraints, and none of the visitable pixels were identified as skippable pixels at step 932, then another prioritization scheme can be used to select which of the visitable pixels are scheduled for the interline detour (for example, removing from the interline detour the visitable pixel(s) whose removal would permit the largest number of visitable pixels to be scheduled for the interline detour, and in the case of a tie simply scheduling the visitable pixel whose x-value is closest to the current pixel). A similar prioritization scheme can be used to resolve scheduling in a situation where there are multiple skippable visitable pixels but those skippable visitable pixels cannot be scheduled for the same interline detour because of ΔT constraints.

At step 938, the current pixel can be tagged with an interline detour alert to inform the scan that an interline detour will be needed to scan to the next pixel in the shot list. Furthermore, if the interline detour operates to hit all of the pixels on the next row, a new scan direction may be needed to hit the pixels of the new next row. If this is the case, step 938 can also involve re-tagging and re-sorting the pixels of the new next row in buffer 950. From step 938, the processor proceeds to step 918, and the next pixel candidate is scheduled as the next pixel in shot list buffer 952 following the detour pixel(s) scheduled at step 938.

If step 936 results in a determination that there are not any visitable pixels for the interline detour, then the processor proceeds to step 918 as previously described.

Furthermore, it should be understood that when a pixel is scheduled at step 938 as part of an interline detour, the processor can remove that pixel from the buffer 950 to avoid it being visited twice during the execution of the process flow.

The process flow of FIG. 9B thus produces a shot list in the shot list buffer 952 that supports a dynamic scan pattern with interline skips and interline detours.

Figure 9C:
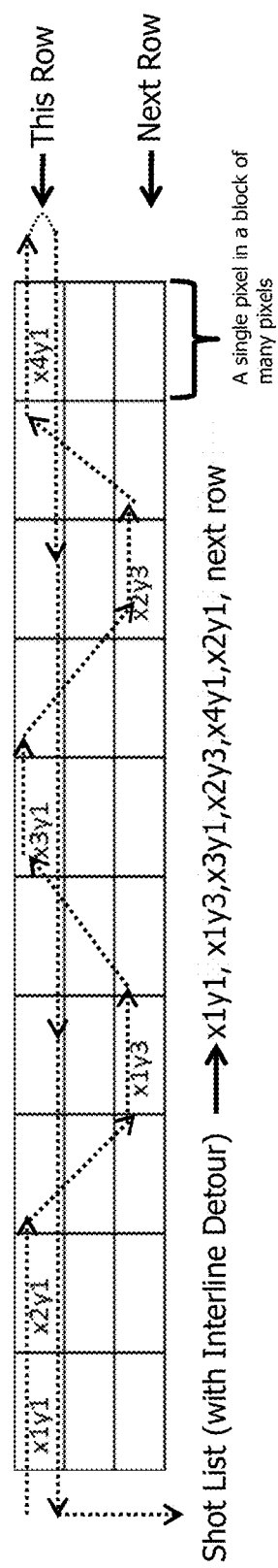

FIG. 9C depicts an example sequence of range points that are scheduled via a shot list in accordance with the process flow of FIG. 9B. It should be understood that the pixels are labeled with an x-axis label xi and a y-axis label yi, where each value of i for xi is incremented to show the sequencing of the pixels along each row, but not to identify the distance between pixels. As such, the x-axis distance between pixels x1y1 and x2y1 is not the same as the x-axis distance between pixels x2y1 and x3y1.

As can be seen in FIG. 9C, the shot list sequence includes interline detours to shoot pixels x1y3 and x2y3. The bottom line of FIG. 9C shows the shot list, which identifies the sequence in which the pixels are shot, while the pixel graph of FIG. 9C shows the scan progressions through the rows and columns. To better understand the concept of visitable pixels with regard to step 922, it can be seen that pixel x1y3 is a visitable pixel for an interline detour from pixel x2y1 given that it was visited by an interline detour. However, when the interline detour from pixel x2y1 was being considered, pixel x2y3 did not qualify as a visitable pixel for an interline detour from pixel x2y1 (although pixel x2y3 did qualify as a visitable pixel from pixel x3y1). The reason that pixel x2y3 did not qualify as a visitable pixel for an interline detour from pixel x2y1 is that, when the interline detour was being considered from pixel x2y1, the next pixel candidate was x3y1, and the x-axis position of pixel x2y3 falls after the x-axis position of pixel x3y1. As such, pixel x2y3 did not fall within the visitable space for an interline detour between pixels x2y1 and x3y1.

FIGS. 9D and 9E depict another example sequence of range points that are scheduled via a shot list in accordance with the process flow of FIG. 9B. In this example, there is a pixel, x4y1, that is shot after x3y1 but on the return pass of the scanner for that row rather than the initial pass of that row because of the small spacing between x3y1 and x4y1. As with FIG. 9C, the bottom line of FIG. 9D shows the shot list portion which identifies the sequence in which the pixels are shot, while the pixel graph of FIG. 9D shows the scan progressions through the rows and columns. FIG. 9E shows the shot progression for the remaining pixels, which includes an interline skip to progress from shooting pixel x1y4 to shooting pixel x1y5. Thus, for the range point list and shot list of FIGS. 9D and 9E, three scans are required to shoot the pixels.

FIG. 9F shows a sample range point list 240 and its corresponding shot list 950, where the shot list 950 is generated in accordance with the process flow of FIG. 9B, where the Min Pulse-to-Pulse Time (labeled as "Shot2ShotMinTime" in FIG. 9F) corresponds to 10 pixels and the DetourTime(N) corresponds to 50 pixels (and where N=1). Once again, it should be understood that different values could be used, and furthermore, these values could vary over the scan field.

The shot list 950 includes meta-information that accompanies each pixel on the shot list. For example, as shown by column 952, each pixel on the shot list can be associated with a flag that identifies whether that pixel is to be shot by the scanner during a left to right scan (a value of "1" in this example) or during a right to left scan (a value of "0" in this example). As another example, as shown by column 954, each pixel on the shot list can be associated with a flag that identifies whether that pixel corresponds to a live waypoint or a real fire command. If a pixel is flagged as a real fire command pixel, this means that the laser source will fire a ladar pulse at such pixel. If a pixel is flagged as a live waypoint, this means that the scanner will scan to that pixel to target it, but the laser source will not fire a ladar pulse toward it. The use of live waypoints can be advantageous in some situations (such as when a constant fiber laser pump source is used). In this example, a value of "1" in column 954 serves to identify a real fire command. As another example, as shown by column 956, each pixel on the shot list can be associated with a code that corresponds to a particular pulse pattern for a ladar pulse. Examples of different pulse patterns are discussed below. As yet another example, as shown by column 958, each pixel on the shot list can be identified by a flag that identifies whether an interline skip (which may include an interline detour) was needed to target the next pixel on the shot list. In this example, a value of "1" would identify that an interline skip was needed to target the next pixel on the shot list.

With the example of FIG. 9F, it can be seen that the use of interline skipping and interline detouring in the translation of the range point list to the shot list results in one less pass being needed by the scanner to shoot the pixels on the shot list. With such a reduction in scan passes, a higher frame rate can be supported by the system.

Figure 10:
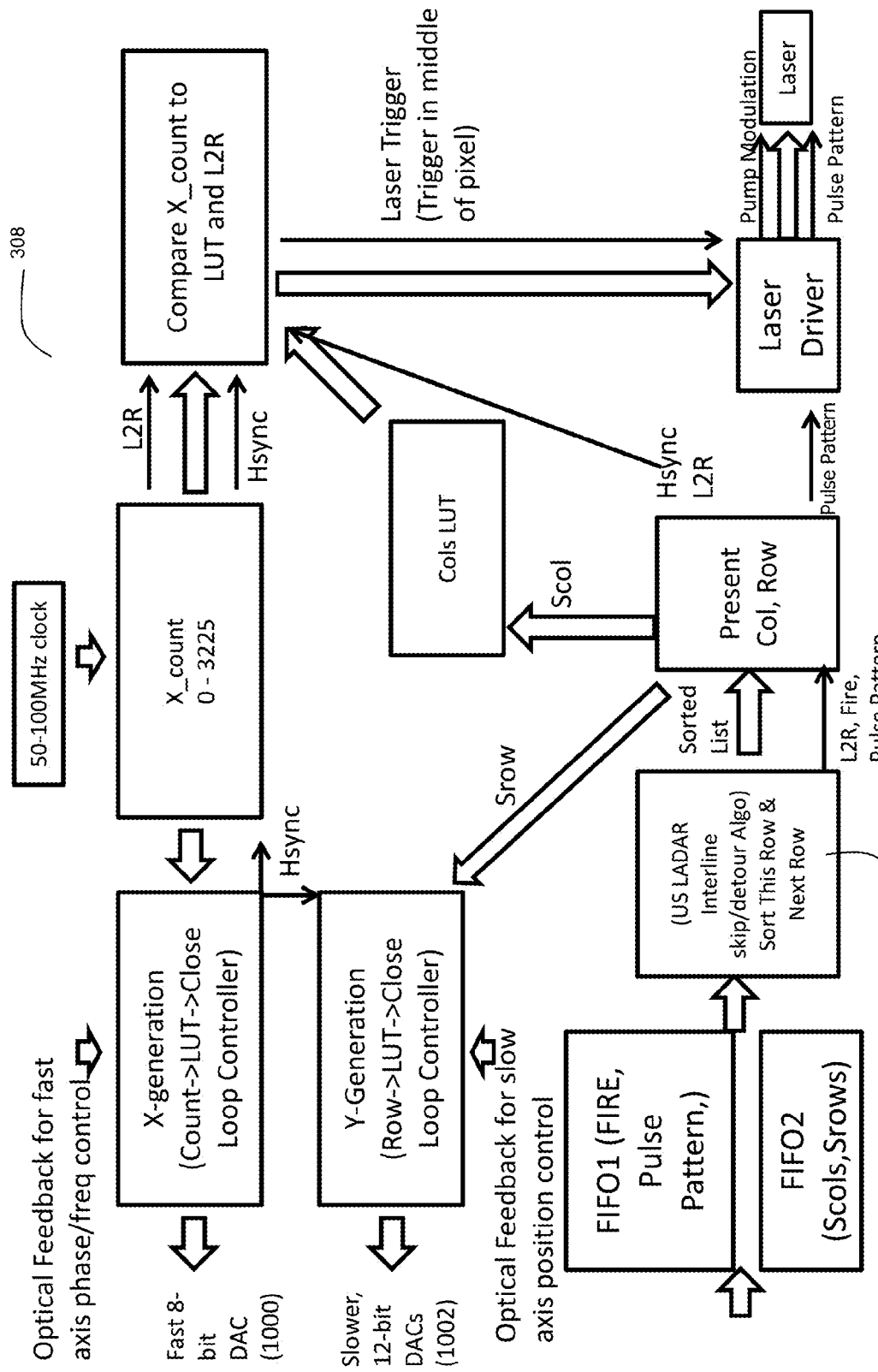
FIG. 10 depicts an example embodiment for a beam scanner controller.

Example Beam Scanner Controller 308:

FIG. 10 depicts an example embodiment for a beam scanner controller 308 that can be used in connection with driving dual MEMS mirrors 500/502 in instances where the shot list includes interline skipping and interline detours. To provide acceleration, the beam scanner controller 308 can take the form of a field programmable gate array (FPGA) with logic deployed thereon as shown in connection with FIG. 10. By leveraging the parallelism that is supported by the reconfigurable hardware logic of an FPGA, the beam scanner controller 308 can operate in an accelerated manner. However, other platforms could be used for the beam scanner controller, including but not limited to microprocessors, ASICs, and the like.

In the example embodiment of FIG. 10, the beam scanner controller receives a range point list 240 as input via FIFO2. FIFO1 can be used to store fire commands and associated pulse patterns for each fire command. The pulse patterns can be ordered within FIFO1 so as to provide a cycling function for different pulse patterns to reduce the risk of interference or ambiguity on the part of a ladar receiver that will receive the reflected ladar pulses.

Component 1000 of FIG. 10 can be configured to perform step 204 of FIG. 2A (e.g., the process flow of FIG. 9B to incorporate both interline skipping and interline detouring). Component 1000 will then output the shot list paired with the control metadata as shown by FIG. 9F and a pulse pattern to be used for each pixel. However, once again, it should be understood that the translation of the range point list to the shot list could be performed by processor 120, in which case the input to FIFO2 would be the shot list rather than the range point list.

The controller 308 will read each pixel out of the shot list in sequence (Present Col, Row) for targeting by the scanner and firing by the laser source. Lookup tables (LUTs) can be used to convert each x-axis value and y-axis value for a pixel on the shot list into digital values that correspond to the mirror scan positions need to target such pixel.

For the X-axis, which in this example operates as a fast-axis in a resonant mode according to a sinusoidal trajectory, the column LUT value will be used to identify an appropriate time slot for the pixel within the scanning mirror's trajectory.

For the Y-axis, which in this example operates as a slow-axis in a point-to-point mode, the row LUT value will be used to identify a voltage needed to drive the Y-axis mirror to a desired scan position. As explained, closed loop feedback control can be used to finely control this Y-axis positioning. The generation of the Y-axis driving voltage would then be based on the row LUT and the closed loop feedback. This voltage value can then be fed to a digital-to-analog converter (DAC) to create the Y-axis driving voltage waveform.

A clock can be used as a source for the sinusoidal X-axis waveform. As examples, the clock frequency can be in the 50-100 MHz range. However, it should be understood that other clock frequencies could be used. To track the X-axis position for the resonant X-axis mirror, a counting mechanism can be used to track the X-axis position as the clock signal modulates according to the sinusoid. For example, if there X-axis space is divided into 3226 positions, the counter can cycle through values from 0 to 3225 for the sine wave half period to track X-axis position. Each counter value generally corresponds to a time slot for a give position along the Y-axis. Moreover, given the sinusoidal nature of the signal, it should be understood that these time slots will not be equally spaced.

This counter value can then be compared with the column LUT value (and the left-to-right (L2R) flag for the current pixel to judge whether the X-axis mirror is on target for the column position of the current pixel. A laser trigger signal can then be provided to the laser driver at an appropriate time when the X-axis position of the mirror corresponds to the X-axis position of the current pixel to be targeted and the Y-axis position of the mirror corresponds to the Y-axis position of the current pixel. In an example embodiment, the laser trigger can be timed to occur in the middle of the X-axis time slot of the sinusoid for the targeted pixel.

The laser driver can respond to this laser trigger signal to drive the laser to fire a ladar pulse toward the targeted pixel in accordance with the pulse pattern that had been associated with that pixel. The laser driver can also provide any desired pump modulation for the laser.

Also, an Hsync signal can be used by the beam scanner controller to identify where the zero point of each row is, which can facilitates Y-axis transitions.

Figure 11A:
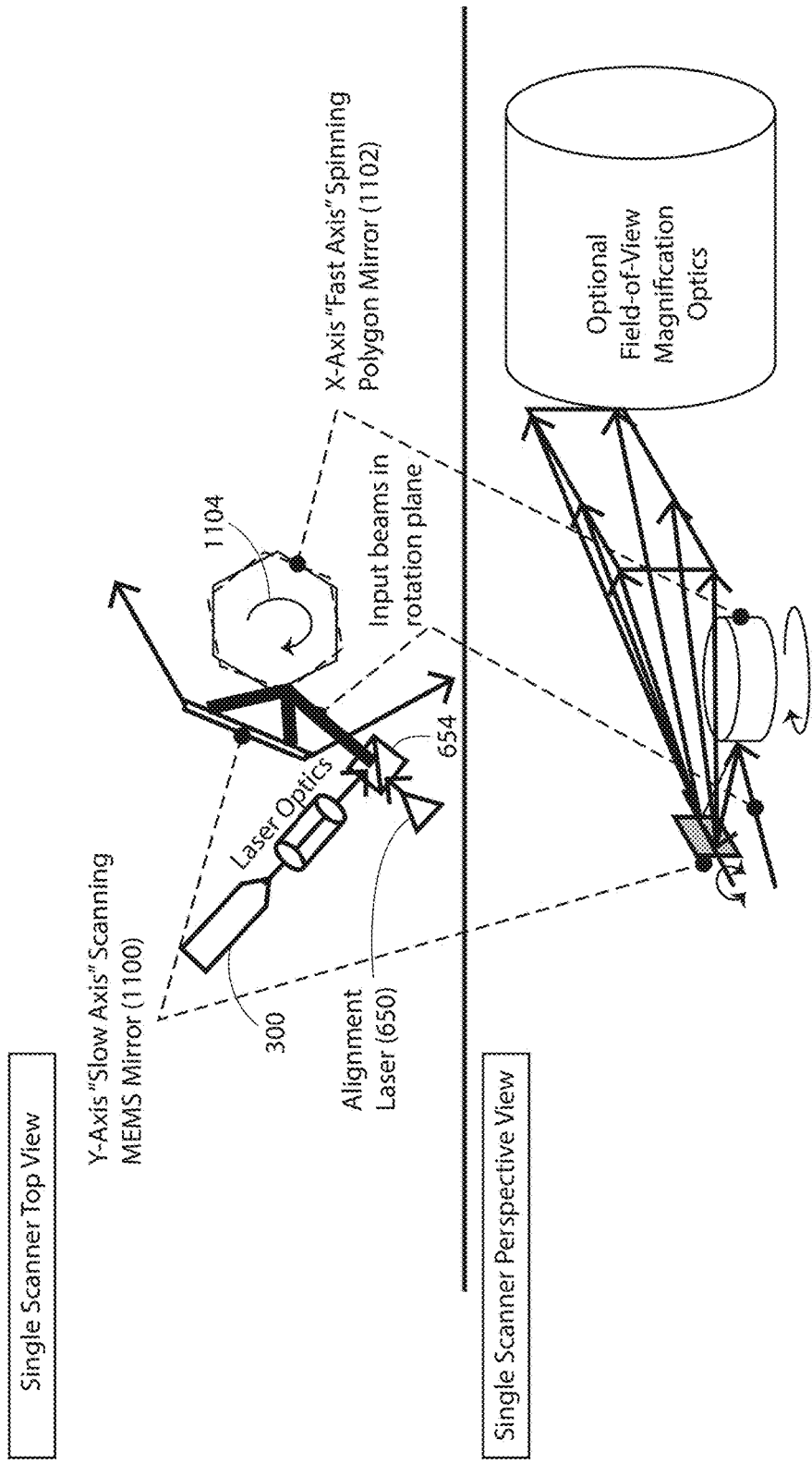

Additional Beam Scanner Embodiments:

As indicated previously, additional example embodiments for the beam scanner 304 may employ a MEMS mirror in combination with a spinning polygon mirror (see FIGS. 11A-G). Such a polygon mirror may spin at rates in the range of approximately 2 kHz to approximately 10 kHz. However, this need not be the case as other values can be used. For example, in additional example embodiments, an N-sided spinning polygon mirror can spin at a rate such that its rotational frequency multiplied by N is around 10-18 times faster than a resonant frequency for the MEMS mirror. Thus, if the MEMS mirror is operating at close to a full bandwidth of around 2 kHz, and the spinning polygon mirror has 4 sides, the spin rate for the polygon mirror can be in a range between around 2.5 kHz to around 4.5 kHz. It should be understood that other ratios may also be used. For ease of illustration, some of the spinning polygons are shown as circles in FIGS. 11A-G. An example of such an arrangement is shown by FIG. 11A, which includes both a top view and a perspective view of such a beam scanner 304. In this example, a single targeting laser source 300 is employed.

The MEMS mirror 1100 is a Y-axis, slow axis mirror while the spinning polygon mirror 1102 is an X-axis, fast axis mirror. The spinning polygon mirror 1102 is positioned to receive an incident laser pulse from laser source 300 (as well as an alignment laser beam from alignment laser 650 for feedback control purposes—see FIG. 6C). The spinning polygon mirror 1102 rotates as shown by rotational direction 1104, and it directs the received laser pulse to the Y-axis MEMS mirror 1100, which in turn reflect the laser pulse to a desired location in the scan area shown by FIG. 11B.

Figure 11B:
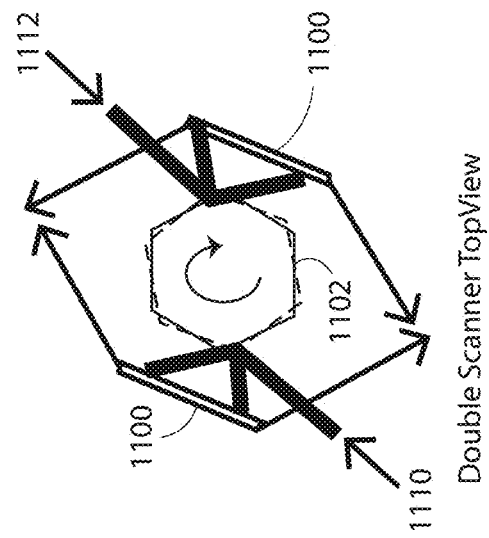
Figure 11B:
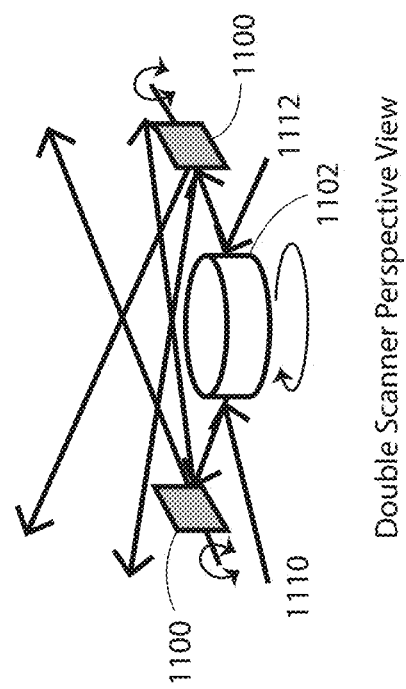

Furthermore, the general arrangement shown by FIG. 11A for a single scanner can also employ two lasers 300 to serve as a double scanner as shown by FIG. 11B. FIG. 11B depicts a perspective view and a top view of a double scanner that employs two Y-axis MEMS mirrors 1100 and a single shared spinning polygon mirror 1102. Separately positioned lasers 300 can direct laser pulses 1110 and 1112 onto the spinning polygon mirror 1102, and this results in the beam scanner generating two targeted outgoing ladar pulses.

FIG. 11C depicts how this general arrangement can support additional targeting lasers, with example embodiments including a triple scanner, a quad scanner, and an N scanner, where N is effectively limited by the space availability for positioning different lasers 300 that lase the spinning polygon from different positions. As an example, N may reach values of 4-16 (or larger) depending upon the desires and needs of a practitioner as discussed below.

FIG. 11D depicts examples of different polygons that can be employed as the spinning polygon mirror 1102, with examples including a square and octagon in addition to the hexagon example shown by FIG. 11A. Furthermore, an N-sided polygon can be employed for mirror 1102, where N is constrained by parameters such as the size of the Y-axis or secondary mirror, the view angle, and the diameter of the polygon to name just a few.

FIG. 11E shows a top view of a beam scanner employing a hexagonal spinning polygon mirror and 4 MEMS mirrors. This example supports 4 scan fields of around 110 degrees. However, up to N independent scan fields of around 20-180 degrees could be supported. It should be understood that a 4-sided mirror spinning at 5 kHz means that a possible row rate of 20 kHz may be supported, although time would be needed for the Y-axis to step down between rows, so the actual row rate may be a lower value (such as around 10 kHz). In general, increasing the number of sides for the spinning polygon mirror means smaller scan fields, where the number of scan fields is more dictated by polygon diameter and Y-axis size, but the size and speed of the Y-axis will also influence the relationship between the number of polygon sides and the number of scan fields and scan field size. Further still, the scan fields can exhibit symmetric angles or non-symmetric angles as shown by FIG. 11F, where the choice between symmetric or non-symmetric angles can be driven by desires for higher resolution in one scan field versus another.

Figure 11G:
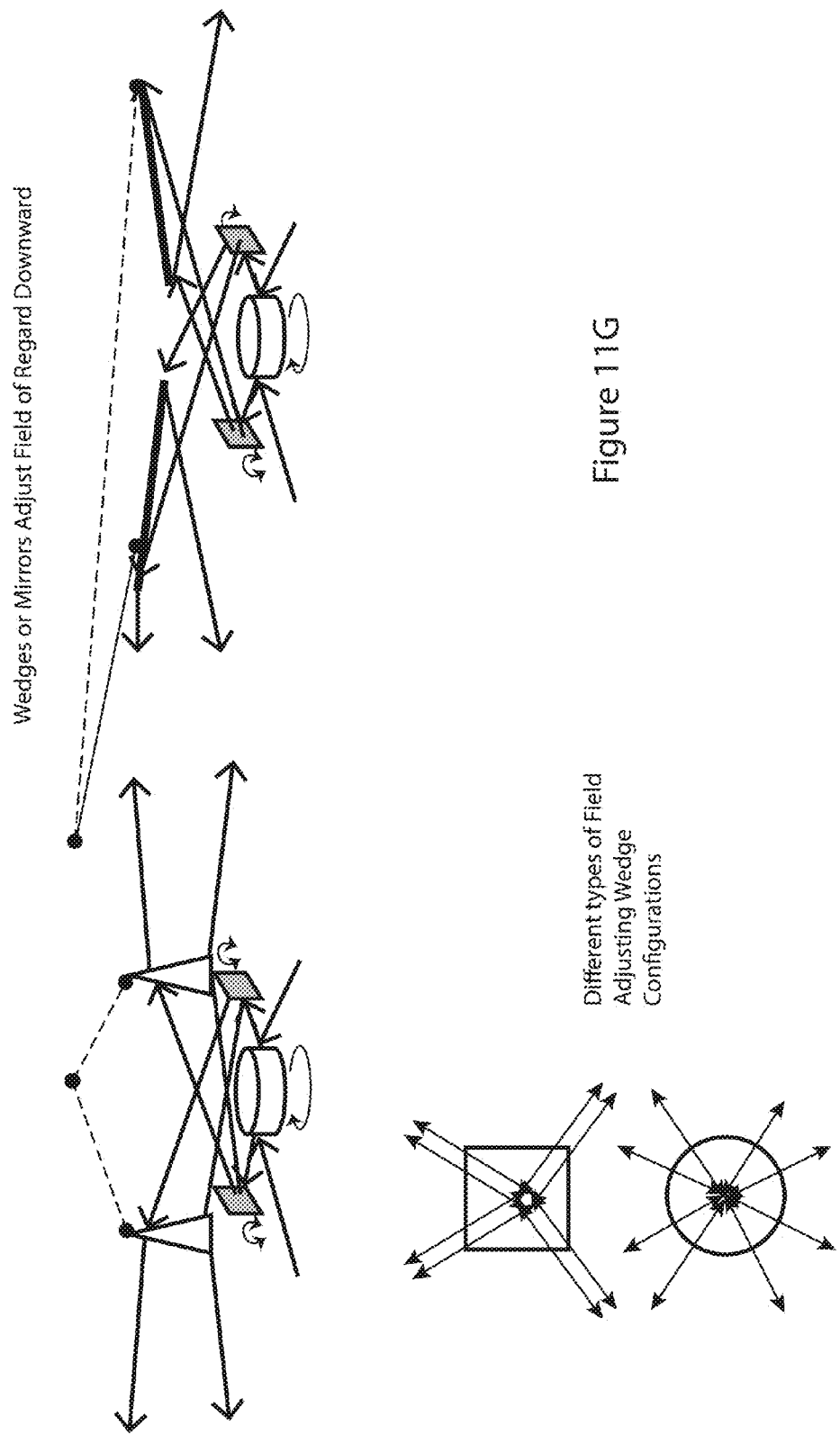

FIG. 11G shows different ways of tilting the vertical field of view (FOV) so that, for example, a car can see the ground and the horizon as well as part of the sky. This can become an issue when there is more than one scan field per spinning polygon mirror.

Figure 12A:
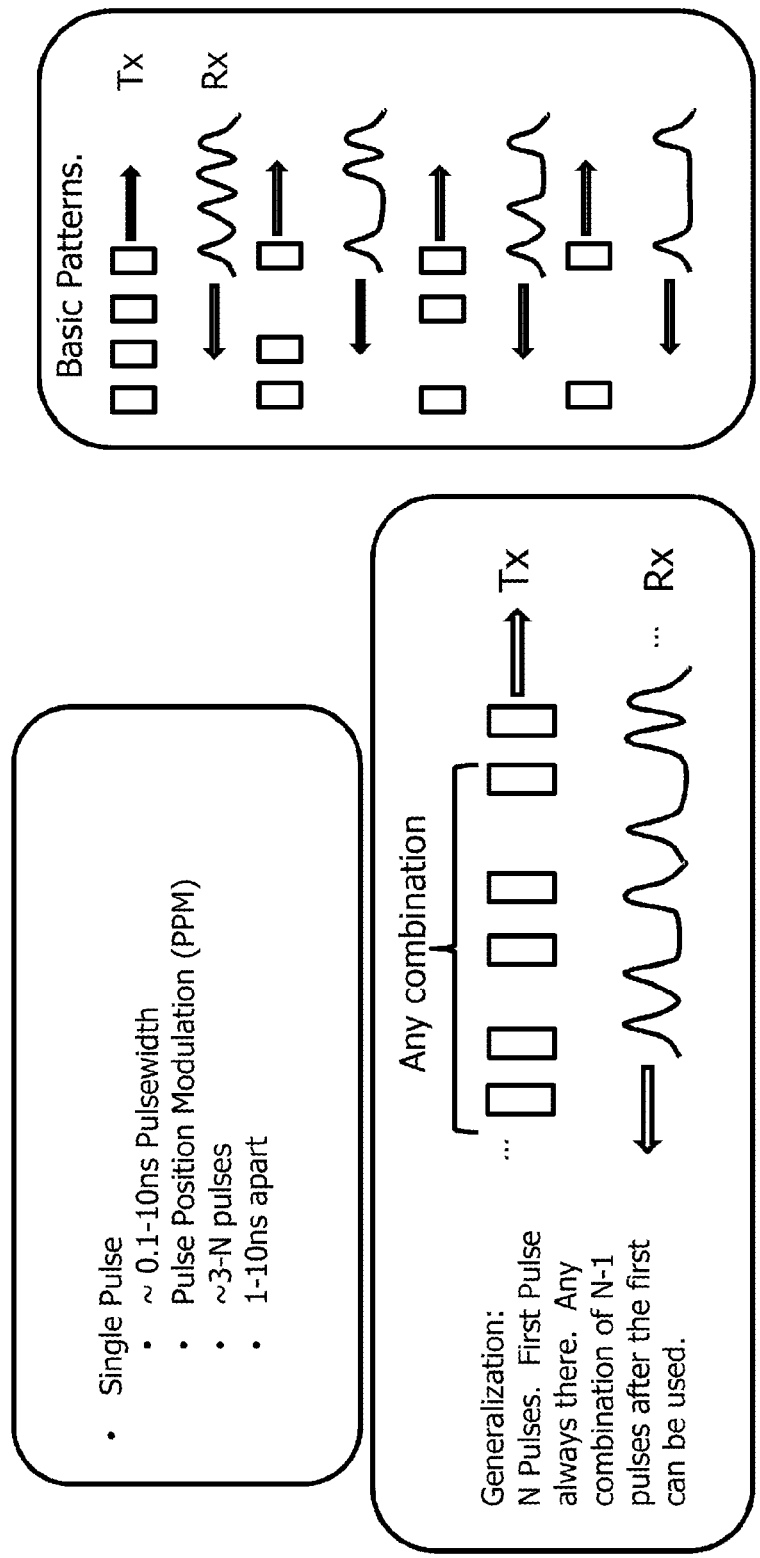
FIGS. 12A and B depict examples of laser pulse encoding patterns that can be used by the ladar transmitter.

FIGS. 12A and B show examples of laser pulse encoding patterns that may be employed by the laser source when transmitting ladar pulses. These encoding patterns are types of intensity modulation schemes that can be applied to the ladar pulses targeted at individual range points. The use of such encoding patterns helps reduce interference and/or increase dynamic range to obtain better accuracy. The ladar pulses can range from a simple no code single pulse or pulse burst to a complex N-code pulse burst to a asymmetric amplitude modulation (AM) bursts.

For example, FIG. 12A examples of pulse position modulation (PPM). An example ladar pulse for PPM can have a pulsewidth of around 0.1 to around 10 ns, and pulse position modulation (PPM) can be employed between pulses. As an example, 3 to N pulses can be used, with the pulses being around 1-10 ns apart. It should be understood that these values are examples only. PPM allows multiple range requests to exist in the air simultaneously. Thus, multiple modulated pulses fired in close succession by a scanning ladar transmission system can be in the air at the same time, and a receiver can meaningfully interpret the reflections of those modulated pulses via demodulation. By way of example, a scanning ladar transmission system can employ two (or more) lasers for generating ladar pulses, where these ladar pulses are pulse modulated relative to each other via PPM. Laser 1 can fire its PPM pulses in close succession with Laser 2's firing of its PPM pulses without interfering with each other. Such an arrangement can permit the scanning ladar transmission system to use a lower effective minimum pulse-to-pulse time because Laser 1 can be recharging while Laser 2 fires (and vice versa). PPM also provides a buffer against interference from the co-location of multiple ladar systems. Thus, if Transmitter 1 (for example, deployed on Vehicle 1) is in close proximity to Transmitter 2 (for example, deployed on Vehicle 2), the two scanning ladar transmitters can fire ladar pulses in a manner with little to no optical interference between the two. Use of PPM can also reduce the signal-to-noise ratio (SNR). FIG. 12A shows an example generalization of PPM, where N pulses are used. The first pulse is always there, any combination of N−1 pulses can be positioned after the first pulse. FIG. 12A also shows some example basic patterns for PPM.

Intensity modulation can also be used for similar purposes as PPM. For example, intensity modulation can also allow for the transmission of multiple interrogations simultaneously because the interrogations can be separated later through demodulation techniques. Intensity modulation can also reduce or eliminate optical interference that might otherwise result from the use of multiple ladar transmitters in close proximity to each other. Furthermore, intensity modulation can increase the dynamic range of a scanning ladar transmission system, which results in improved range accuracy.

Figure 12B:
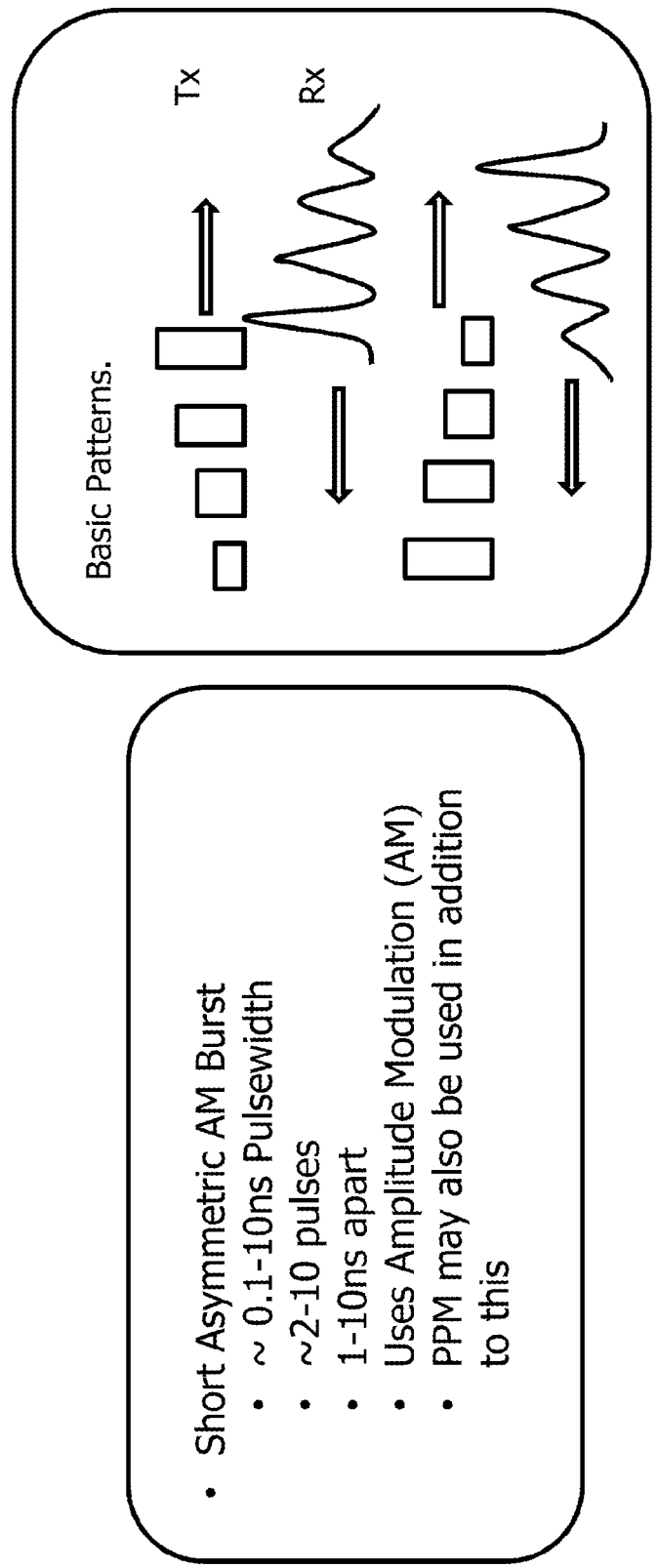

As an example of intensity modulation, FIG. 12B shows examples of basic patterns for short asymmetric amplitude modulation (AM) pulse bursts. The ladar pulses can have different amplitudes in different ratios. Short asymmetric AM pulse bursts provide for an increase in dynamic range (i.e., the signal stays within the acceptable intensity range to be properly detected so that range information can be detected more accurately). An example ladar pulse for an AM pulse burst can have a pulsewidth of around 0.1 to around 10 ns, with around 2 to around 10 pulses being included in the burst, and where the pulses are around 1 to around 10 ns apart. As noted, AM can be used to distinguish the individual pulses. It should be understood that these values are examples only. Moreover, it should be understood that PPM may be used in addition to AM.

Furthermore, it should be understood that additional or alternate techniques could be employed to reduce interference and resolve potential ambiguities, including but not limited to polarization modulation, phase modulation with coherent combining, or even the use of additional lasers having different colors. Each additional or alternative technique can provide its own tradeoffs for use in the system. For example, the use of two lasers of different colors can provide an advantage in permitting the use of a lower Min Pulse-to-Pulse Time for the shot lists (as one laser can be re-charging while the other laser is firing or it allows two simultaneous received pulses to be demodulated by a receiver).

Additional Embodiments for Range Point Down-Selection

It should be understood that the dynamic range point selection techniques described herein can also be used to effect improvements in ladar technology in other ways.

For example, dynamic range point selection techniques can be used as a post-scan compression tool rather than a pre-scan tool. That is, rather than using the dynamic range point selection technique described herein to limit the number of range points that are targeted by a transmitted ladar pulse, the dynamic range point selection techniques can be used as a compression tool on a high volume ladar point cloud.

For example, the scanning ladar transmission system could be employed to shoot a full array of range points (as opposed to the sparse array described in connection with embodiments that are disclosed above). This would result in the creation of a point cloud with a large volume of range points. Then, post-scan, a dynamic range point selection technique such as the one described in connection with FIGS. 2C and 2D could be performed to choose which range points should be retained for a compressed point cloud. While such post-scan compression would not enjoy the improvements in frame rate or pulse energy that are exhibited by the pre-scan down-selection of range points, it should be understood that the compressed point cloud could provide its own benefits. For example, in situations where there is a need to communicate a point cloud over a bandwidth-sensitive channel, the intelligently compressed point cloud would be advantageous.

The use of the dynamic range point selection technique as a compression tool for point clouds can be especially useful for compressing 3D point clouds, which typically have very high volumes of points. As an example, the 3D point cloud can be flattened to a desired 2D perspective, and the 2D points can be analyzed to select a subset thereof as intelligent range points using techniques described herein. This subset of points can then serve as the compressed point cloud.

Similarly, a dynamic range point selection technique such as that described by FIGS. 2C and 2D can be used to compress a point cloud that would result from a flash ladar transmission system.

As another example, the scanning ladar transmission system could be employed to target range points using a classic grid scan rather than using a dynamic scan pattern, and the dynamic range point selection technique could be used to select which range points that the laser source will actually fire a ladar pulse at as the transmitter scans through the grid. A classic grid scan would be a fixed scan where the scanning ladar transmission system visits all points in the scan area. However, rather than having the laser source fire at all of the targeted range points, a dynamic range point selection technique such as that described by FIGS. 2C and 2D can be used to select which range points will be shot at by the ladar transmitter. While such a fixed scan would provide little or no improvement in terms of the system's frame rate or pulse energy relative to the dynamic scan embodiments described herein, the down-selection of range points would still provide some data bandwidth reduction and power management benefits because the transmitter can avoid firing ladar pulses at all of the possible range points.

While the present invention has been described above in relation to its exemplary embodiments, various modifications may be made thereto that still fall within the invention's scope. Such modifications to the invention will be recognizable upon review of the teachings herein.

What is claimed is:

1. A method comprising:
processing a shot list, the shot list comprising a plurality of range points for targeting by a scanning ladar transmission system;
controlling a spiral dynamic scan pattern for the scanning ladar transmission system by scanning a mirror to a plurality of mirror scan positions based on the processed shot list to target the range points of the processed shot list according to the spiral dynamic scan pattern, wherein the mirror scan positions define where the scanning ladar transmission system is targeted; and
transmitting, by the controlled scanning ladar transmission system, a plurality of ladar pulses toward the range points of the processed shot list in accordance with the spiral dynamic scan pattern.

2. The method of claim 1 wherein the spiral dynamic scan pattern comprises an elliptical spiral dynamic scan pattern.

3. The method of claim 2 wherein the elliptical spiral dynamic scan pattern includes a member of the group consisting of interellipse skipping and interellipse detouring.

4. The method of claim 1 wherein the mirror comprises a first mirror and a second mirror, the first mirror scanning with respect to a first axis for targeting the scanning ladar transmission system along the first axis, the second mirror scanning with respect to a second axis that is orthogonal to the first axis for targeting the scanning ladar transmission system along the second axis, wherein the combination of the mirror scan positions for the first and second mirrors defines the range points to which the scanning ladar transmission system is targeted; and
wherein the controlling step comprises:
scanning the first mirror in a plurality of directions in a resonant mode based on the processed shot list; and
scanning the second mirror in a plurality of directions in a resonant mode based on the processed shot list.

5. The method of claim 4 further comprising:
controlling the scanning steps by applying a first driving voltage to the first mirror and applying a second driving voltage to the second mirror, each driving voltage having an amplitude.

6. The method of claim 5 further comprising:
controlling an amplitude of the spiral for the spiral dynamic scan pattern by varying the amplitudes of the first and second driving voltages.

7. The method of claim 6 wherein the spiral dynamic scan pattern comprises an elliptical spiral dynamic scan pattern, the method further comprising:
varying the amplitudes of the first and second driving voltages to perform an interellipse skip for the elliptical spiral dynamic scan pattern.

8. The method of claim 6 wherein the spiral dynamic scan pattern comprises an elliptical spiral dynamic scan pattern, the method further comprising:
varying the amplitudes of the first and second driving voltages to perform an interellipse detour for the elliptical spiral dynamic scan pattern.

9. The method of claim 6 wherein the spiral dynamic scan pattern comprises an elliptical spiral dynamic scan pattern, the method further comprising:
varying the amplitudes of the first and second driving voltages to perform an ellipse skip for the elliptical spiral dynamic scan pattern.

10. The method of claim 6 wherein the spiral dynamic scan pattern comprises an elliptical spiral dynamic scan pattern, the method further comprising:
varying the amplitudes of the first and second driving voltages to perform an ellipse repeat for the elliptical spiral dynamic scan pattern.

11. The method of claim 4 wherein the first and second mirrors comprise microelectromechanical systems (MEMS) mirrors.

12. The method of claim 4 further comprising:
a light source directing a plurality of ladar pulses onto the first mirror;
the first mirror reflecting the ladar pulses onto the second mirror; and
the second mirror reflecting the ladar pulses for transmission toward the targeted range points, the targeted range points being defined by the combination of mirror scan positions for the first and second mirrors when the ladar pulses are incident thereon.

13. The method of claim 12 wherein the step of the first mirror reflecting the ladar pulses onto the second mirror comprises the first mirror reflecting the ladar pulses through relay imaging optics onto the second mirror.

14. The method of claim 1 further comprising;
generating the shot list to define the spiral dynamic scan pattern.

15. The method of claim 14 wherein the spiral dynamic scan pattern comprises an elliptical spiral dynamic scan pattern, and wherein the generating step comprises;
a processor sorting a plurality of the range points into a sort order to create the shot list, wherein the sorting comprises the processor identifying a plurality of interellipse skips within the elliptical spiral dynamic scan pattern based on a parameter indicative of an amount of time needed by the scanning ladar transmission system to scan from a current ring of the spiral to another ring of the spiral.

16. The method of claim 14 wherein the generating step comprises;
a processor sorting a plurality of the range points into a sort order to create the shot list, wherein the sorting comprises the processor identifying a plurality of ellipse repeats within the elliptical spiral dynamic scan pattern based on a parameter indicative of an amount of time needed between successive ladar pulses.

17. The method of claim 14 wherein the generating step comprises;
a processor sorting a plurality of the range points into a sort order to create the shot list, wherein the sorting comprises the processor identifying a plurality of interellipse detours within the elliptical spiral dynamic scan pattern based on a parameter indicative of an amount of time needed by the scanning ladar transmission system to (i) scan from a current ring of the spiral to another ring of the spiral, (ii) scan to a range point in the another ring, and (iii) return to the current ring.

18. The method of claim 1 further comprising a processor (1) applying a range point down selection algorithm to data representative of a field of view for the scanning ladar transmission system, and (2) selecting a subset of range points within the field of view for targeting by the scanning ladar transmission system based on the applied range point down selection algorithm, wherein the selected subset of range points serve as the range points targeted by the transmitting step.

19. An apparatus comprising:
a scanning ladar transmission system configured to direct a plurality of ladar pulses toward a plurality of range points via a plurality of scannable mirrors, wherein the scanning ladar transmission system comprises:
a beam scanner, the beam scanner including a first mirror and a second mirror, wherein the beam scanner is configured to (1) scan the first mirror to a plurality of mirror scan positions in response to a first driving voltage to target the scanning ladar transmission system along a first axis, and (2) scan the second mirror to a plurality of mirror scan positions in response to a second driving voltage to target the scanning ladar transmission system along a second axis, and wherein the combination of the mirror scan positions for the first and second mirrors defines the range points to which the scanning ladar transmission system is targeted; and
a beam scanner controller, wherein the beam scanner controller is configured to generate the first and second driving voltages for use by the beam scanner such that the first and second driving voltages define a spiral dynamic scan pattern for the scanning ladar transmission system with respect to the range points.

20. The apparatus of claim 19 wherein the spiral dynamic scan pattern comprises an elliptical spiral dynamic scan pattern.

21. The apparatus of claim 19 wherein the scanning ladar transmission system further comprises:
a light source positioned and configured to direct a plurality of ladar pulses onto the first mirror, whereupon the first mirror is configured to reflect the ladar pulses onto the second mirror, whereupon the second mirror is configured to reflect the ladar pulses for transmission toward the targeted range points, the targeted range points being defined by the combination of mirror scan positions for the first mirror and the second mirror when the ladar pulses are incident thereon.

22. The apparatus of claim 21 wherein the first and second mirrors comprise a microelectromechanical systems (MEMS) mirrors.

23. The apparatus of claim 21 wherein the beam scanner is further configured to (1) scan the first mirror in a plurality of directions in a resonant mode in response to the first driving voltage, and (2) scan the second mirror in a plurality of directions in a resonant mode in response to the second driving voltage.

24. The apparatus of claim 23 wherein the spiral dynamic scan pattern comprises an elliptical spiral dynamic scan pattern, and wherein the beam scanner controller is configured to vary an amplitude of the first driving voltage and an amplitude of the second driving voltage to control an amplitude of the spiral for the elliptical spiral dynamic scan pattern.

25. The apparatus of claim 24 wherein the beam scanner controller is further configured to vary the amplitudes of the first and second driving voltages to cause the beam scanner to scan the first the second mirrors in a fashion that defines an interellipse skip for the elliptical spiral dynamic scan pattern.

26. The apparatus of claim 25 wherein the beam scanner controller is further configured to generate the first and second driving voltages based on a shot list that defines a targeting order for the range points, the apparatus further comprising:
a processor configured to identify a plurality of interellipse skips within the elliptical spiral dynamic scan pattern for the shot list based on a parameter indicative of an amount of time needed by the scanning ladar transmission system to scan from a current ring of the spiral to another ring of the spiral.

27. The apparatus of claim 26 wherein the processor is part of the beam scanner controller.

28. The apparatus of claim 24 wherein the beam scanner controller is further configured to vary the amplitudes of the first and second driving voltages to cause the beam scanner to scan the first the second mirrors in a fashion that defines an interellipse detour for the elliptical spiral dynamic scan pattern.

29. The apparatus of claim 28 wherein the beam scanner controller is further configured to generate the first and second driving voltages based on a shot list that defines a targeting order for the range points, the apparatus further comprising:
a processor configured to identify a plurality of interellipse detours within the elliptical spiral dynamic scan pattern for the shot list based on a parameter indicative of an amount of time needed by the scanning ladar transmission system to (i) scan from a current ring of the spiral to another ring of the spiral, (ii) scan to a range point in the another ring, and (iii) return to the current ring.

30. The apparatus of claim 29 wherein the processor is part of the beam scanner controller.

31. The apparatus of claim 24 wherein the beam scanner controller is further configured to vary the amplitudes of the first and second driving voltages to cause the beam scanner to scan the first the second mirrors in a fashion that defines an ellipse repeat for the elliptical spiral dynamic scan pattern.

32. The apparatus of claim 31 wherein the beam scanner controller is further configured to generate the first and second driving voltages based on a shot list that defines a targeting order for the range points, the apparatus further comprising:
a processor configured to identify a plurality of ellipse repeats within the elliptical spiral dynamic scan pattern for the shot list based on a parameter indicative of an amount of time needed between successive ladar pulses.

33. The apparatus of claim 32 wherein the processor is part of the beam scanner controller.

34. The apparatus of claim 24 wherein the beam scanner controller is further configured to vary the amplitudes of the first and second driving voltages to cause the beam scanner to scan the first the second mirrors in a fashion that defines an ellipse skip for the elliptical spiral dynamic scan pattern.

35. The apparatus of claim 21 wherein the beam scanner further comprises relay imaging optics between the first and second mirrors.

36. The apparatus of claim 19 wherein the scanning ladar transmission system further comprises a processor, the processor configured to (1) apply a range point down selection algorithm to data representative of a field of view for the scanning ladar transmission system, and (2) select a subset of range points within the field of view for targeting by the scanning ladar transmission system based on the applied range point down selection algorithm, wherein the selected subset of range points serve as the range points targeted by the directed ladar pulses.

* * * * *